United States Patent
Shao

(10) Patent No.: US 12,482,435 B2
(45) Date of Patent: Nov. 25, 2025

(54) ILLUMINATION DEVICE AND ILLUMINATION SYSTEM

(71) Applicant: Japan Display Inc., Tokyo (JP)

(72) Inventor: Gang Shao, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/034,921

(22) Filed: Jan. 23, 2025

(65) Prior Publication Data

US 2025/0166581 A1 May 22, 2025

Related U.S. Application Data

(63) Continuation of application No. PCT/JP2023/024995, filed on Jul. 5, 2023.

(30) Foreign Application Priority Data

Jul. 27, 2022 (JP) ................................ 2022-119986

(51) Int. Cl.
*G09G 3/36* (2006.01)

(52) U.S. Cl.
CPC ........... *G09G 3/36* (2013.01); *G09G 2310/08* (2013.01); *G09G 2320/0626* (2013.01)

(58) Field of Classification Search
CPC ..... H10K 59/00–95; H10K 59/10; F21S 2/00; G02F 1/1347; G02F 1/13; G02F 1/13338; G02F 1/1337; G02F 1/1343; G02F 2203/18; G02F 2203/24; G09G 2310/08; G09G 2320/0626; G09G 3/36; G09G 2320/0247; G09G 3/20; G09G 3/32; G09G 3/3406; G09G 2320/0233
See application file for complete search history.

(56) References Cited

FOREIGN PATENT DOCUMENTS

| JP | H02-065001 A | 3/1990 |
|---|---|---|
| JP | 2009-004329 A | 1/2009 |

OTHER PUBLICATIONS

Search Report issued in related International Patent Application No. PCT/JP2023/024995, mailed on Aug. 15, 2023 and English translation of same. 5 pages.

*Primary Examiner* — Sanjiv D. Patel
(74) *Attorney, Agent, or Firm* — K&L Gates LLP

(57) ABSTRACT

An illumination device and an illumination system that are capable of achieving dynamic light distribution control by using 1/f fluctuation are provided. The illumination device includes: a light source; an optical element provided on an optical axis of the light source and configured to control a light distribution state of light emitted from the light source in two directions of a first direction and a second direction different from the first direction; and a processing circuit configured to execute at least light distribution control processing for the optical element. The processing circuit dynamically controls the light distribution state in at least one of the first direction or the second direction by using 1/f fluctuation based on a light distribution setting value that is a setting value for executing the light distribution control processing.

15 Claims, 25 Drawing Sheets

| UPPER BITS | | LOWER BITS | | FLUCTUATION CONTROL | FLUCTU-ATION WIDTH |
|---|---|---|---|---|---|
| 3 | 2 | 1 | 0 | | |
| 0 | 0 | * | * | DISABLED | DISABLED |
| 0 | 1 | 0 | 0 | LIGHT ADJUSTMENT FLUCTUATION | 5 [%] |
| | | 0 | 1 | | 10 [%] |
| | | 1 | 0 | | 20 [%] |
| | | 1 | 1 | | 30 [%] |
| 1 | 0 | 0 | 0 | LIGHT DISTRIBUTION FLUCTUATION | 5 [%] |
| | | 0 | 1 | | 10 [%] |
| | | 1 | 0 | | 20 [%] |
| | | 1 | 1 | | 30 [%] |
| 1 | 1 | 0 | 0 | LIGHT ADJUSTMENT FLUCTUATION | 5 [%] |
| | | 0 | 1 | | 10 [%] |
| | | 1 | 0 | LIGHT DISTRIBUTION FLUCTUATION | 20 [%] |
| | | 1 | 1 | | 30 [%] |

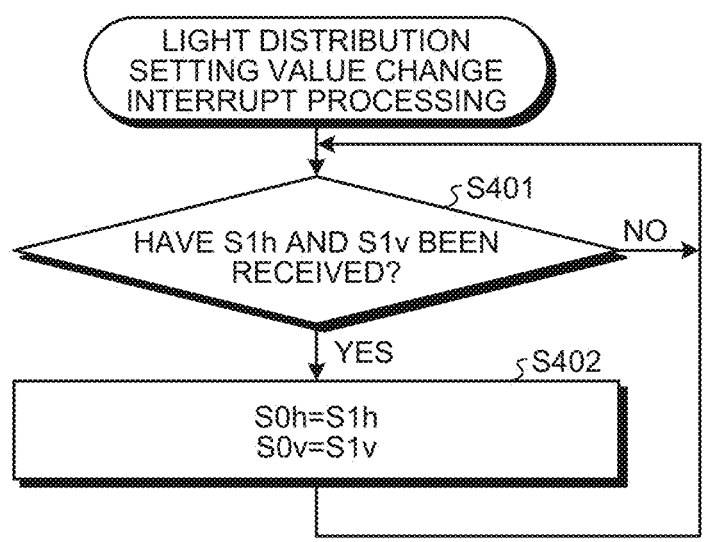

ILLUMINATION DEVICE AND ILLUMINATION SYSTEM

CROSS-REFERENCE TO RELATED APPLICATIONS

This application claims the benefit of priority from Japanese Patent Application No. 2022-119986 filed on Jul. 27, 2022 and International Patent Application No. PCT/JP2023/024995 filed on Jul. 5, 2023, the entire contents of which are incorporated herein by reference.

BACKGROUND

1. Technical Field

The present invention relates to an illumination device and an illumination system.

2. Description of the Related Art

In a conventional illumination instrument, a light source such as an LED is combined with a thin lens provided with a prism pattern, and the distance between the light source and the thin lens is changed to change light spread (hereinafter also referred to as "light distribution"). For example, an illumination instrument is disclosed in which the front of a transparent light bulb is covered by a liquid crystal light adjustment element, and the transmittance of a liquid crystal layer is changed to switch directly reaching light and scattering light (for example, Japanese Patent Application Laid-open Publication No. H02-65001 (JP-A-H02-65001)). Also disclosed is an illumination control device that, for example, changes the brightness of illumination over time to achieve flickering light like a candle flame (for example, Japanese Patent Application Laid-open Publication No. 2009-004329 (JP-A-2009-004329)).

The 1/f fluctuation, which harmonizes regularity and irregularity, is a phenomenon universally observed in nature, such as in a candle flame and the murmuring of a river, and can provide psychological comfort. For example, it is desired to enable creation of a fluctuation effect as described above with an illumination device that allows for light distribution control.

For the foregoing reasons, there is a need for providing an illumination device and an illumination system that are capable of achieving dynamic light distribution control by using 1/f fluctuation.

SUMMARY

According to an aspect of the present disclosure, an illumination device includes: a light source; an optical element provided on an optical axis of the light source and configured to control a light distribution state of light emitted from the light source in two directions of a first direction and a second direction different from the first direction; and a processing circuit configured to execute at least light distribution control processing for the optical element. The processing circuit dynamically controls the light distribution state in at least one of the first direction or the second direction by using 1/f fluctuation based on a light distribution setting value that is a setting value for executing the light distribution control processing.

According to another aspect of the present disclosure, an illumination system includes: an illumination device including a light source, an optical element, and a processing circuit, the optical element being provided on an optical axis of the light source and configured to control a light distribution state of light emitted from the light source in two directions of a first direction and a second direction different from the first direction, the processing circuit being configured to execute at least light distribution control processing for the optical element; and a control device capable of changing at least the light distribution state of the illumination device in the two directions of the first and second directions. The processing circuit dynamically controls the light distribution state in at least one of the first direction or the second direction by using 1/f fluctuation based on a light distribution setting value that is a setting value for executing the light distribution control processing.

BRIEF DESCRIPTION OF THE DRAWINGS

FIG. 24 is a flowchart illustrating an example of light distribution setting value change interrupt processing.

DETAILED DESCRIPTION

Aspects (embodiments) of the present invention will be described below in detail with reference to the accompanying drawings. Contents described below in the embodiments do not limit the present invention. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the invention is contained in the scope of the present invention. For clearer description, the drawings are schematically illustrated for the width, thickness, shape, and the like of each component as compared to an actual aspect in some cases, but the drawings are merely exemplary and do not limit interpretation of the present invention. In the present specification and drawings, any element same as that already described with reference to an already described drawing is denoted by the same reference sign, and detailed description thereof is omitted as appropriate in some cases.

Figure 1A:
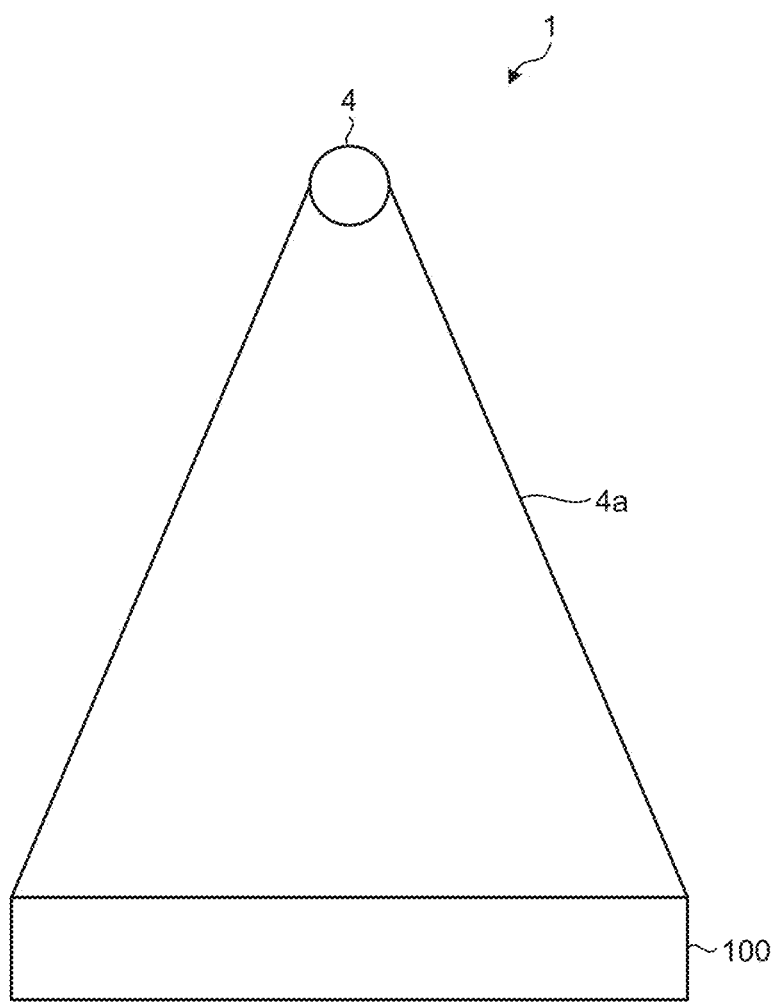
FIG. 1A is a side view illustrating an example of an illumination device according to an embodiment.
Figure 1B:
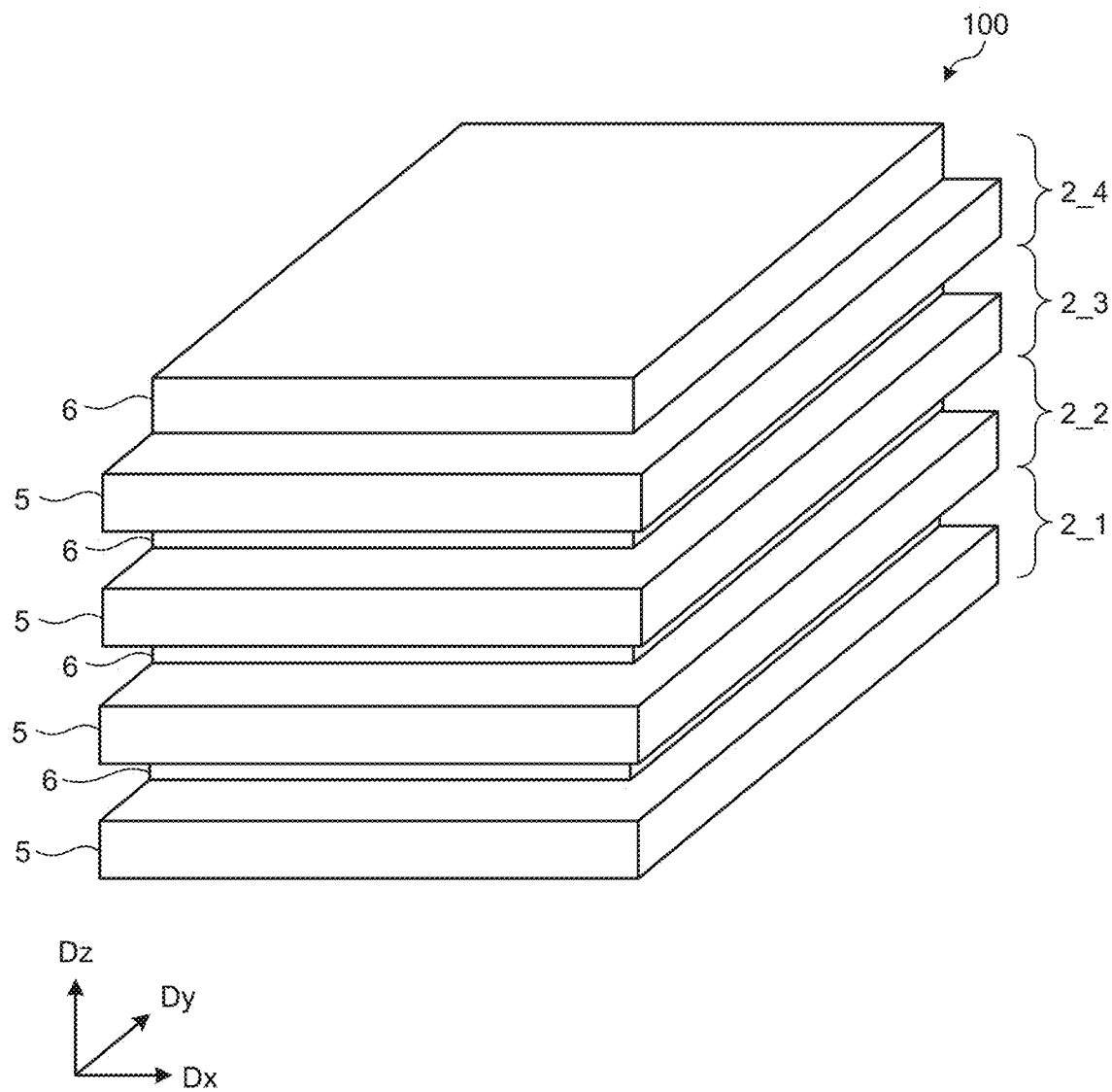
FIG. 1B is a perspective view illustrating an example of an optical element according to the embodiment.

FIG. 1A is a side view illustrating an example of an illumination device according to an embodiment. FIG. 1B is a perspective view illustrating an example of an optical element according to the embodiment. As illustrated in FIG. 1A, the illumination device 1 includes a light source 4, a reflector 4a, and an optical element 100. As illustrated in FIG. 1B, the optical element 100 includes a first liquid crystal cell 2_1, a second liquid crystal cell 2_2, a third liquid crystal cell 2_3, and a fourth liquid crystal cell 2_4. The light source 4 is constituted by, for example, a light emitting diode (LED). The reflector 4a is a component that condenses light from the light source 4 to the optical element 100.

In FIG. 1B, a Dz direction indicates the emission direction of light from the light source 4 and the reflector 4a. The optical element 100 has a configuration in which the first liquid crystal cell 2_1, the second liquid crystal cell 2_2, the third liquid crystal cell 2_3, and the fourth liquid crystal cell 2_4 are stacked in the Dz direction. In the present disclosure, the optical element 100 has a configuration in which the first liquid crystal cell 2_1, the second liquid crystal cell 2_2, the third liquid crystal cell 2_3, and the fourth liquid crystal cell 2_4 are sequentially stacked from the light source 4 side (lower side in FIG. 1B). In FIG. 1B, one direction of a plane orthogonal to the Dz direction and parallel to stacking surfaces of the first liquid crystal cell 2_1, the second liquid crystal cell 2_2, the third liquid crystal cell 2_3, and the fourth liquid crystal cell 2_4 is set as a Dx direction (first direction), and a direction orthogonal to both the Dx direction and the Dz direction is set as a Dy direction (second direction).

The first liquid crystal cell 2_1, the second liquid crystal cell 2_2, the third liquid crystal cell 2_3, and the fourth liquid crystal cell 2_4 each have the same configuration. In the present disclosure, the first liquid crystal cell 2_1 and the fourth liquid crystal cell 2_4 are liquid crystal cells for p-wave polarization. The second liquid crystal cell 2_2 and the third liquid crystal cell 2_3 are liquid crystal cells for s-wave polarization. Hereinafter, the first liquid crystal cell 2_1, the second liquid crystal cell 2_2, the third liquid crystal cell 2_3, and the fourth liquid crystal cell 2_4 are also collectively referred to as "liquid crystal cells 2".

Figure 2:
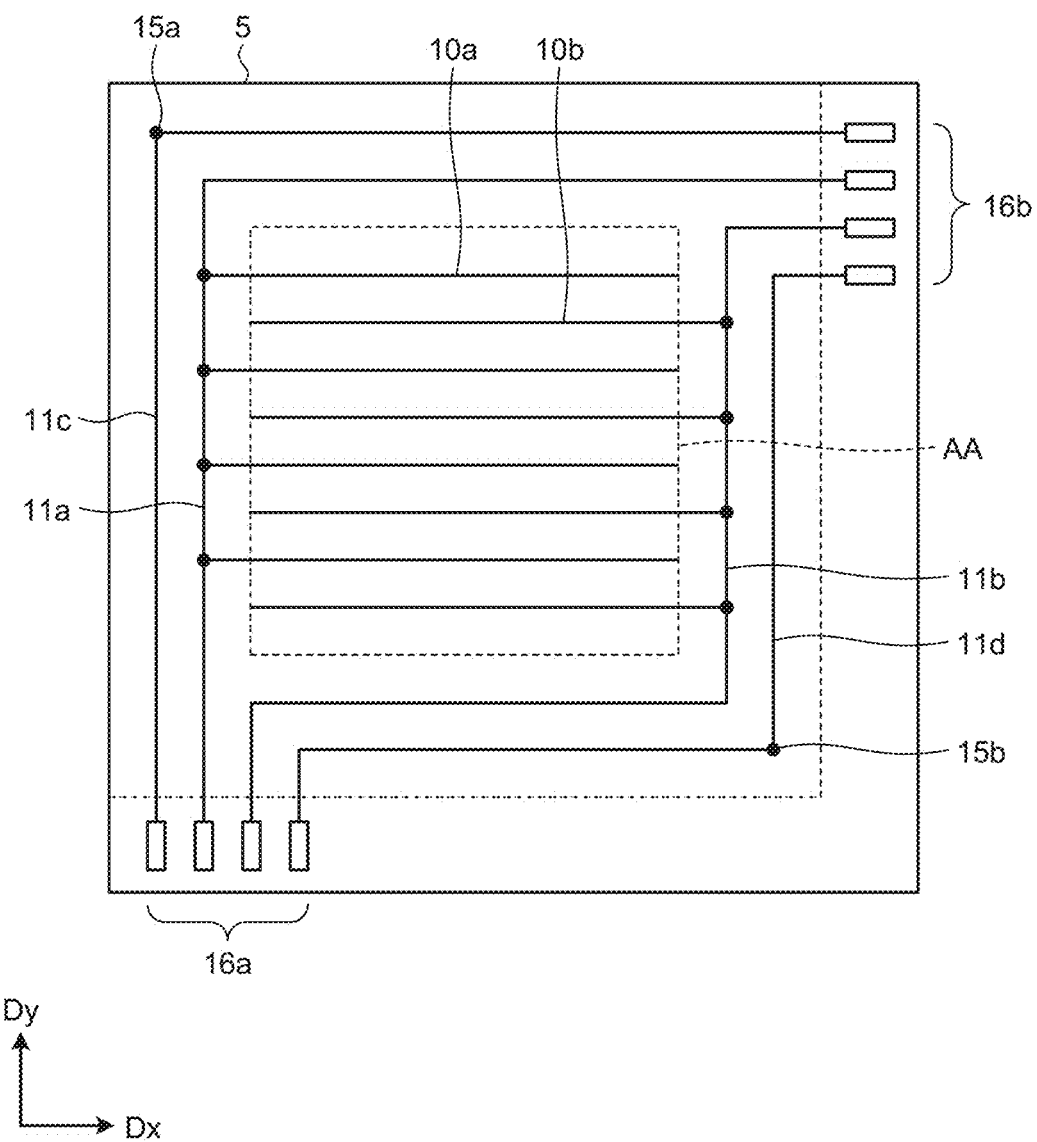
FIG. 2 is a schematic plan view of a first substrate when viewed in a Dz direction.
Figure 3:
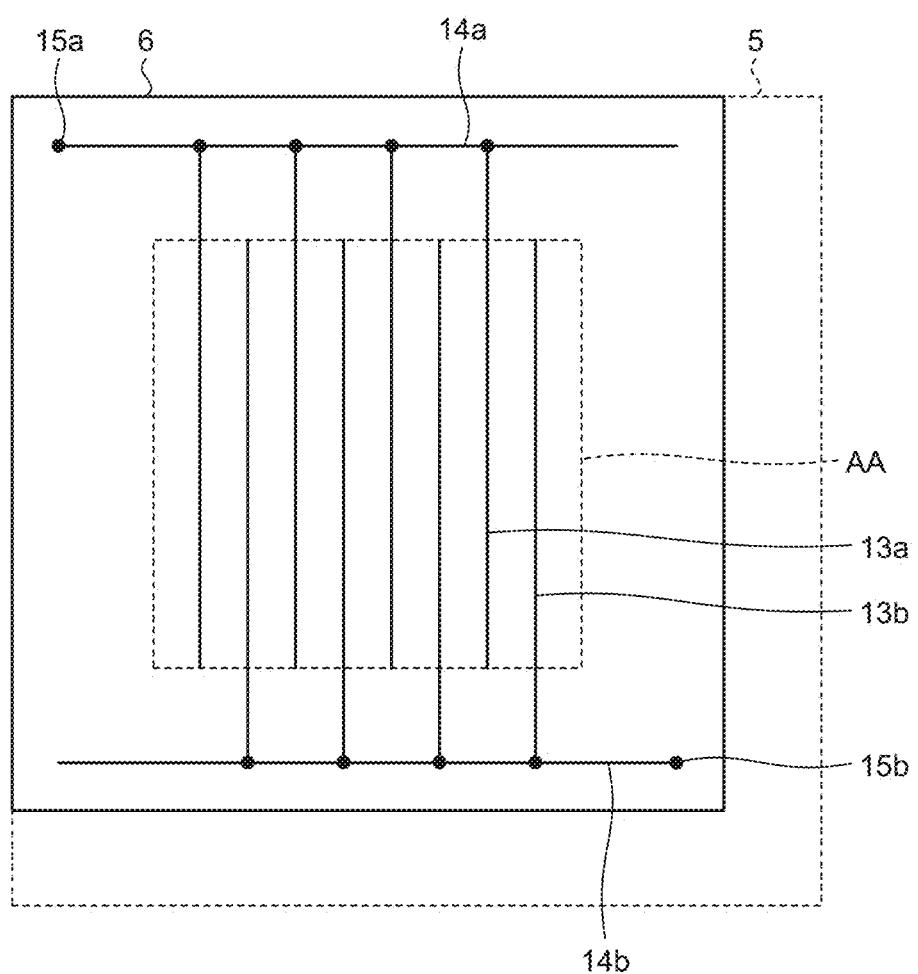
FIG. 3 is a schematic plan view of a second substrate when viewed in the Dz direction.
Figure 4:
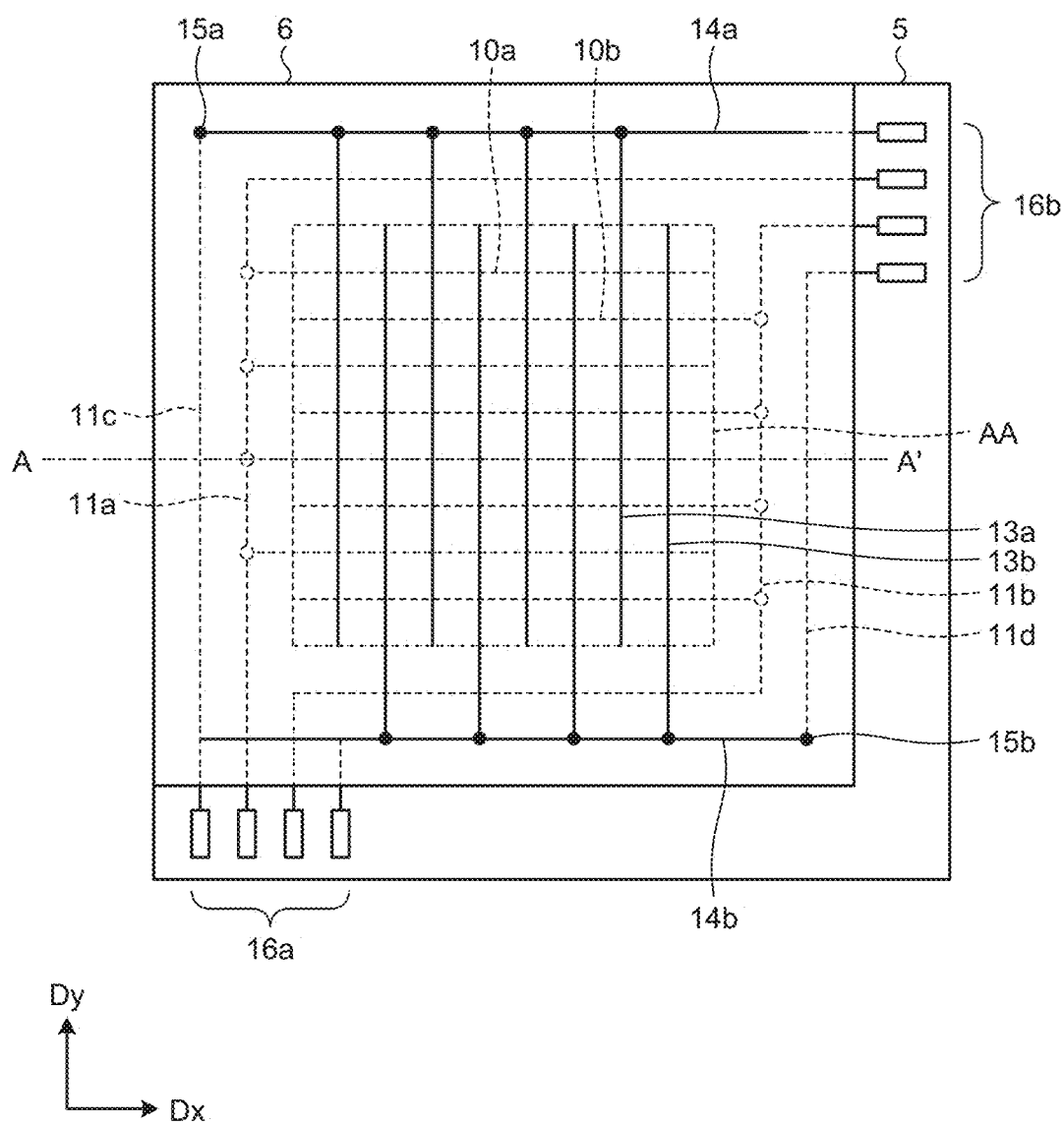
FIG. 4 is a fluoroscopic diagram of a liquid crystal cell in which the first substrate and the second substrate are placed over in the Dz direction.
Figure 5:
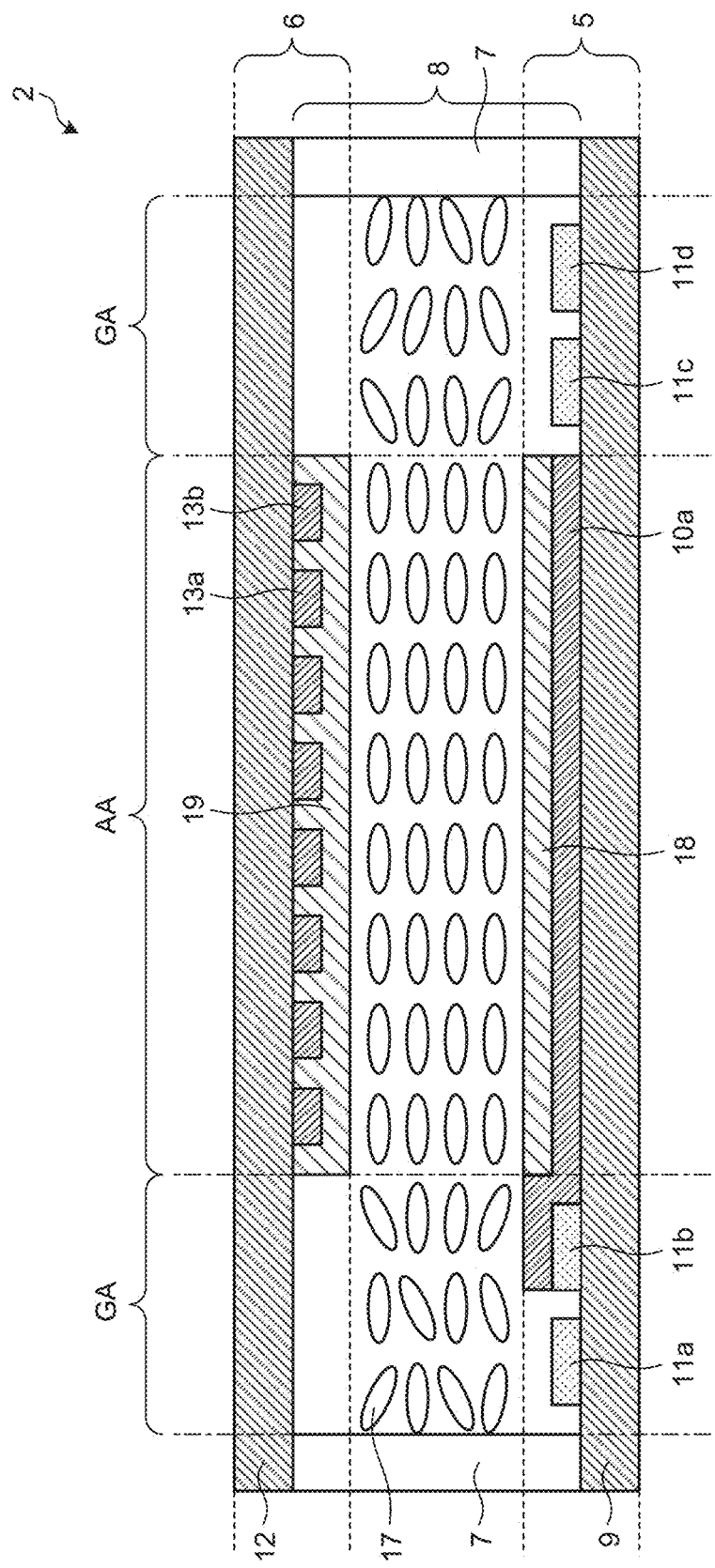
FIG. 5 is a sectional view along line A-A' illustrated in FIG. 4.

Each liquid crystal cell 2 includes a first substrate 5 and a second substrate 6. FIG. 2 is a schematic plan view of the first substrate when viewed in the Dz direction. FIG. 3 is a schematic plan view of the second substrate when viewed in the Dz direction. In FIG. 3, drive electrodes are visible through the substrates, but for clarity, drive electrodes and wires are illustrated with solid lines. FIG. 4 is a fluoroscopic diagram of a liquid crystal cell in which the first substrate and the second substrate are placed over in the Dz direction. In FIG. 4 as well, for clarity, drive electrodes and wires on the second substrate side are illustrated with solid lines, and drive electrodes and wires on the first substrate side are illustrated with dotted lines. FIG. 5 is a sectional view along line A-A' illustrated in FIG. 4. FIGS. 2, 3, 4, and 5 exemplarily illustrate the third liquid crystal cell 2_3 and the fourth liquid crystal cell 2_4 in which drive electrodes 10a and 10b of the first substrate 5 extend in the Dx direction and drive electrodes 13a and 13b of the second substrate 6 extend in the Dy direction.

As illustrated in FIG. 5, the liquid crystal cell 2 includes a liquid crystal layer 8 sealed around its periphery by a sealing member 7 and provided between the first substrate 5 and the second substrate 6.

The liquid crystal layer 8 modulates light passing through the liquid crystal layer 8 in accordance with the state of electric field. As liquid crystal molecules, positive-type nematic liquid crystals are used, but other liquid crystals with the same effects may be used.

As illustrated in FIG. 2, the drive electrodes 10a and 10b, a plurality of metal wires 11a and 11b that supply drive voltage applied to the drive electrodes 10a and 10b, and a plurality of metal wires 11c and 11d that supply drive voltage applied to the drive electrodes 13a and 13b (refer to FIG. 3) provided on the second substrate 6 to be described later are provided on the liquid crystal layer 8 side of a base material 9 of the first substrate 5. The metal wires 11a, 11b, 11c, and 11d are provided in a wiring layer of the first substrate 5. The metal wires 11a, 11b, 11c, and 11d are provided at intervals in the wiring layer on the first substrate 5. Hereinafter, the drive electrodes 10a and 10b are simply referred to as "drive electrodes 10" in some cases. The metal wires 11a, 11b, 11c, and 11d are referred to as "first metal wires 11" in some cases. As illustrated in FIG. 2, in the third liquid crystal cell 2_3 and the fourth liquid crystal cell 2_4, the drive electrodes 10 on the first substrate 5 extend in the Dx direction. In the first liquid crystal cell 2_1 and the second liquid crystal cell 2_2, the drive electrodes 10 on the first substrate 5 extend in the Dy direction.

As illustrated in FIG. 3, the drive electrodes 13a and 13b and a plurality of metal wires 14a and 14b that supply drive voltage applied to these drive electrodes 13 are provided on the liquid crystal layer 8 side of a base material 12 of the second substrate 6 illustrated in FIG. 5. The metal wires 14a and 14b are provided in a wiring layer of the second substrate 6. The metal wires 14a and 14b are provided at intervals in the wiring layer on the second substrate 6. Hereinafter, the drive electrodes 13a and 13b are simply referred to as "drive electrodes 13" in some cases. The metal wires 14a and 14b are referred to as "second metal wires 14" in some cases. As illustrated in FIG. 3, in the third liquid crystal cell 2_3 and the fourth liquid crystal cell 2_4, the drive electrodes 13 on the second substrate 6 extend in the Dy direction. In the first liquid crystal cell 2_1 and the second liquid crystal cell 2_2, the drive electrodes 13 on the second substrate 6 extend in the Dx direction.

The drive electrodes 10 and 13 are translucent electrodes formed of a translucent conductive material (translucent conductive oxide) such as indium tin oxide (ITO). The first substrate 5 and the second substrate 6 are translucent substrates of glass, resin, or the like. The first metal wires 11 and the second metal wires 14 are formed of at least one metallic material among aluminum (Al), copper (Cu), silver (Ag), molybdenum (Mo), and alloy thereof. The first metal wires 11 and the second metal wires 14 may be each formed of one or more of these metallic materials as a multilayered body of a plurality of layers. The at least one metallic material among aluminum (Al), copper (Cu), silver (Ag), molybdenum (Mo), and alloy thereof has a resistance lower than that of translucent conductive oxide such as ITO.

The metal wire 11c of the first substrate 5 and the metal wire 14a of the second substrate 6 are coupled by a conduction part 15a made of, for example, conductive paste. The metal wire 11d of the first substrate 5 and the metal wire 14b of the second substrate 6 are coupled by a conduction part 15b made of, for example, conductive paste.

Coupling (Flex-on-Board) terminal parts 16a and 16b coupled to non-illustrated flexible printed circuits (FPC) are provided in a region on the first substrate 5 that does not overlap the second substrate 6 in the Dz direction. The coupling terminal parts 16a and 16b each include four coupling terminals corresponding to the metal wires 11a, 11b, 11c, and 11d.

The coupling terminal parts 16a and 16b are provided in the wiring layer of the first substrate 5. Drive voltage to be applied to the drive electrodes 10a and 10b on the first substrate 5 and the drive electrodes 13a and 13b on the second substrate 6 is supplied to the liquid crystal cell 2 from an FPC coupled to the coupling terminal part 16a or the coupling terminal part 16b. Hereinafter, the coupling terminal parts 16a and 16b are simply referred to as "coupling terminal parts 16" in some cases.

As illustrated in FIG. 4, in the liquid crystal cell 2, the first substrate 5 and the second substrate 6 overlap in the Dz direction (irradiation direction of light), and the drive electrodes 10 on the first substrate 5 intersect the drive electrodes 13 on the second substrate 6 when viewed in the Dz direction. In the liquid crystal cell 2 thus configured, the alignment direction of liquid crystal molecules 17 in the liquid crystal layer 8 can be controlled by supplying drive voltage to the drive electrodes 10 on the first substrate 5 and the drive electrodes 13 on the second substrate 6. A region in which the alignment direction of the liquid crystal molecules 17 in the liquid crystal layer 8 can be controlled is referred to as an "effective region AA". The diffusion degree of light transmitting through the effective region AA of the liquid crystal cell 2 can be controlled as refractive index distribution of the liquid crystal layer 8 changes in the effective region AA. A region outside the effective region AA, where the liquid crystal layer 8 is sealed by the sealing member 7 is referred to as a "peripheral region GA" (refer to FIG. 5).

As illustrated in FIG. 5, the drive electrodes 10 (in FIG. 5, the drive electrode 10a) in the effective region AA of the first substrate 5 are covered by an alignment film 18. The drive electrodes 13 (in FIG. 5, the drive electrodes 13a and 13b) in the effective region AA of the second substrate 6 are covered by an alignment film 19. The alignment direction of the liquid crystal molecules is different between the alignment film 18 and the alignment film 19.

Figure 6A:
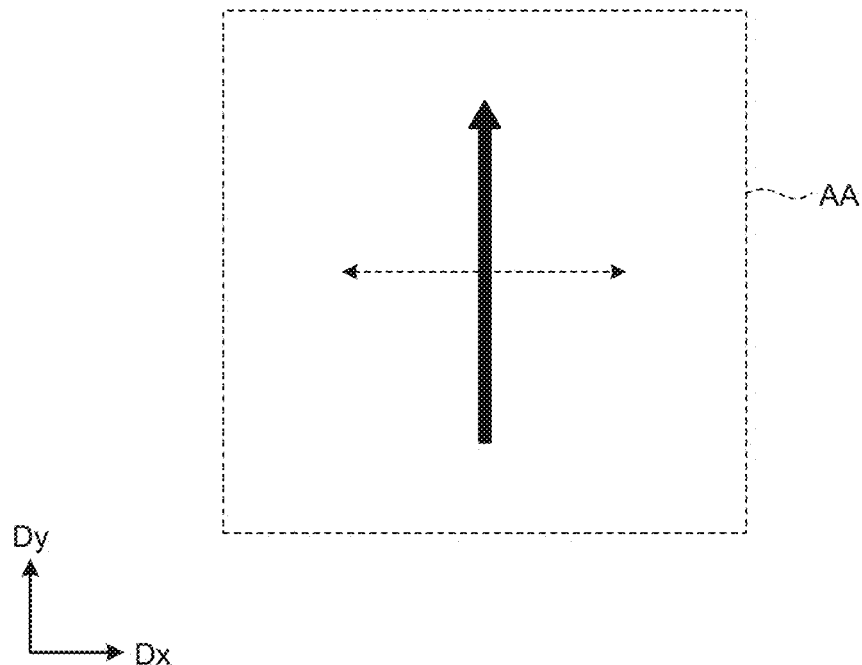
FIG. 6A is a diagram illustrating the alignment direction of an alignment film of the first substrate.
Figure 6B:
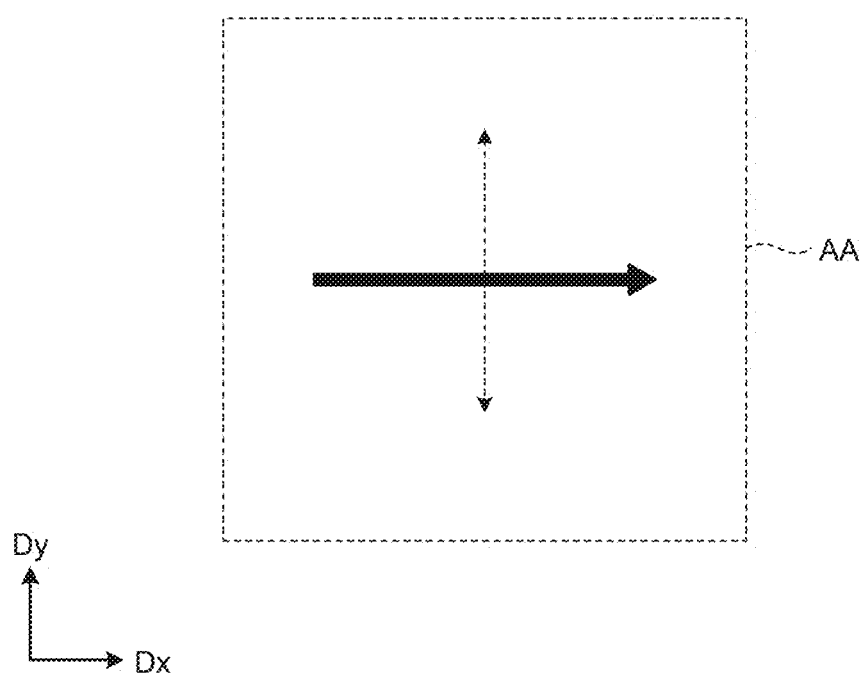
FIG. 6B is a diagram illustrating the alignment direction of an alignment film of the second substrate.

FIG. 6A is a diagram illustrating the alignment direction of the alignment film of the first substrate. FIG. 6B is a diagram illustrating the alignment direction of the alignment film of the second substrate.

As illustrated in FIGS. 6A and 6B, the alignment direction of the alignment film 18 of the first substrate 5 and the alignment direction of the alignment film 19 of the second substrate 6 are directions intersecting each other in a plan view. Specifically, as illustrated with a solid arrow in FIG. 6A, the alignment direction of the alignment film 18 of the first substrate 5 is orthogonal to the extending direction of the drive electrodes 10a and 10b, which is illustrated with a dashed arrow in FIG. 6A. As illustrated with a solid arrow in FIG. 6B, the alignment direction of the alignment film 19 of the second substrate 6 is orthogonal to the extending direction of the drive electrodes 13a and 13b, which is illustrated with a dashed arrow in FIG. 6B. In the following description, the extending directions of the drive electrodes 10 and 13 are orthogonal to the alignment directions of the alignment films 18 and 19 covering them, but these may intersect at an angle other than orthogonal, for example, in the angle range of 85° to 90°. The drive electrodes 10 on the first substrate 5 side and the drive electrodes 13 on the second substrate 6 side are preferably orthogonal to each other but may intersect, for example, in the angle range of 85° to 90°. The alignment directions of the alignment films 18 and 19 are formed by rubbing processing or light alignment processing.

Figure 7:
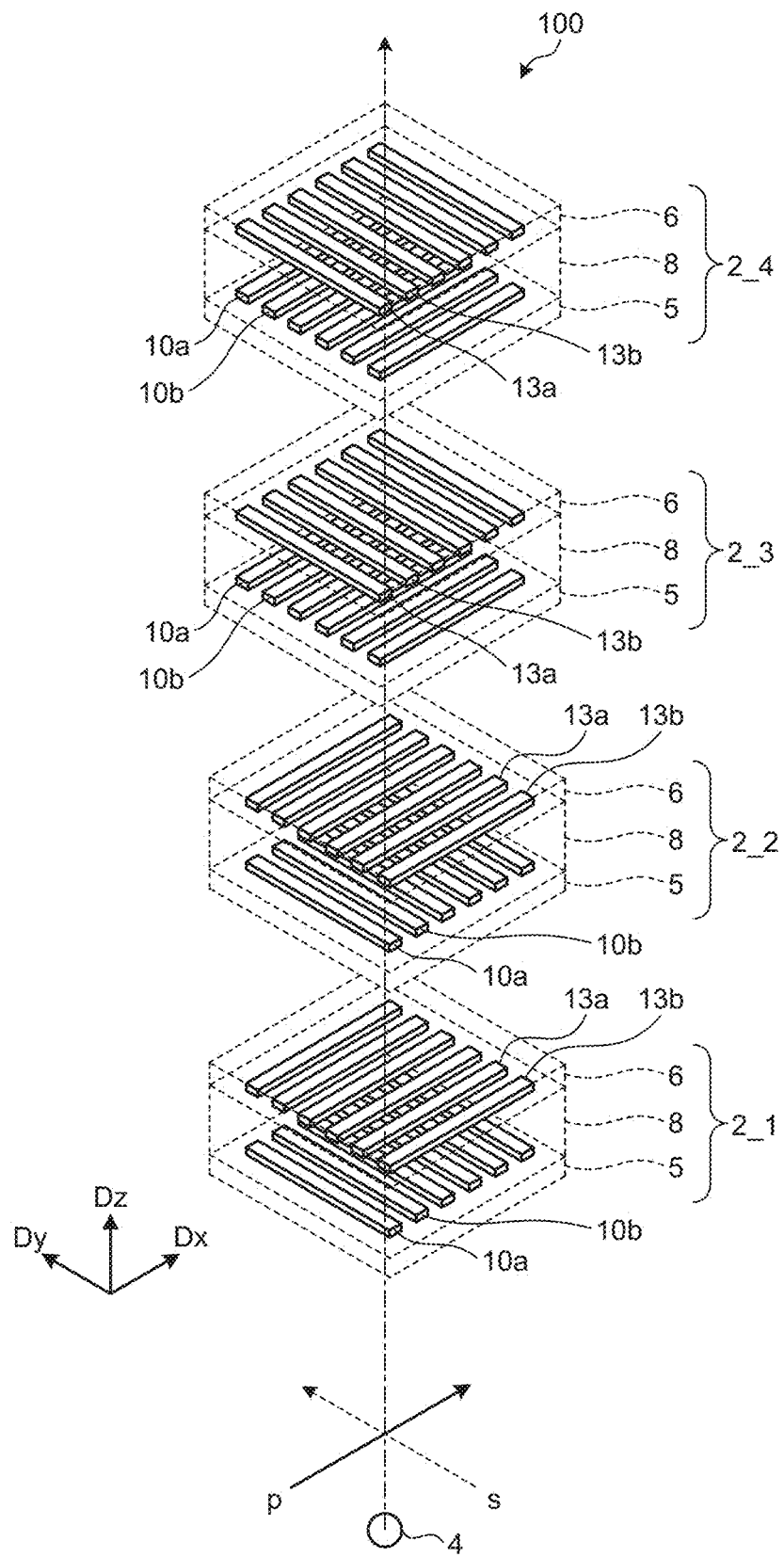
FIG. 7 is a multilayered structure diagram of the optical element according to the embodiment.

A mechanism for changing the shape of light by using the liquid crystal cells 2 (the first liquid crystal cell 2_1, the second liquid crystal cell 2_2, the third liquid crystal cell 2_3, and the fourth liquid crystal cell 2_4) will be described below. FIG. 7 is a multilayered structure diagram of the optical element according to the embodiment. FIGS. 8A, 8B, 8C, and 8D are conceptual diagrams for description of light shape change through the optical element according to the embodiment. FIGS. 8A, 8B, 8C, and 8D illustrate examples in which potential difference is generated between the drive electrodes of hatched substrates of the liquid crystal cells 2.

As illustrated in FIG. 7, the optical element 100 is provided on the optical axis of the light source 4, which is illustrated with a dashed and single-dotted line, and as described above, the first liquid crystal cell 2_1, the second liquid crystal cell 2_2, the third liquid crystal cell 2_3, and the fourth liquid crystal cell 2_4 are sequentially stacked from the light source 4 side (lower side in FIG. 7). The third liquid crystal cell 2_3 and the fourth liquid crystal cell 2_4 are stacked in a state of being rotated by 90° relative to the first liquid crystal cell 2_1 and the second liquid crystal cell 2_2.

In each liquid crystal cell 2, the alignment directions of the alignment films on the first substrate 5 side and the second substrate 6 side intersect each other as illustrated in FIGS. 6A and 6B. Accordingly, the orientation of the liquid crystal molecules in the liquid crystal layer 8 gradually changes from the Dx direction to the Dy direction (or from the Dy direction to the Dx direction) as the position moves from the first substrate 5 side toward the second substrate 6 side, and the polarized light component of transmitted light rotates along with the change. Specifically, in the liquid crystal cell 2, the polarized light component, which was a p-polarized component on the first substrate 5 side, changes to an s-polarized light component as the position moves toward the second substrate 6 side, and the polarized light component, which was an s-polarized light component on the first substrate 5 side, changes to a p-polarized component as the position moves toward the second substrate 6 side. This rotation of the polarized light component may be referred to as optical rotation.

Figure 8A:
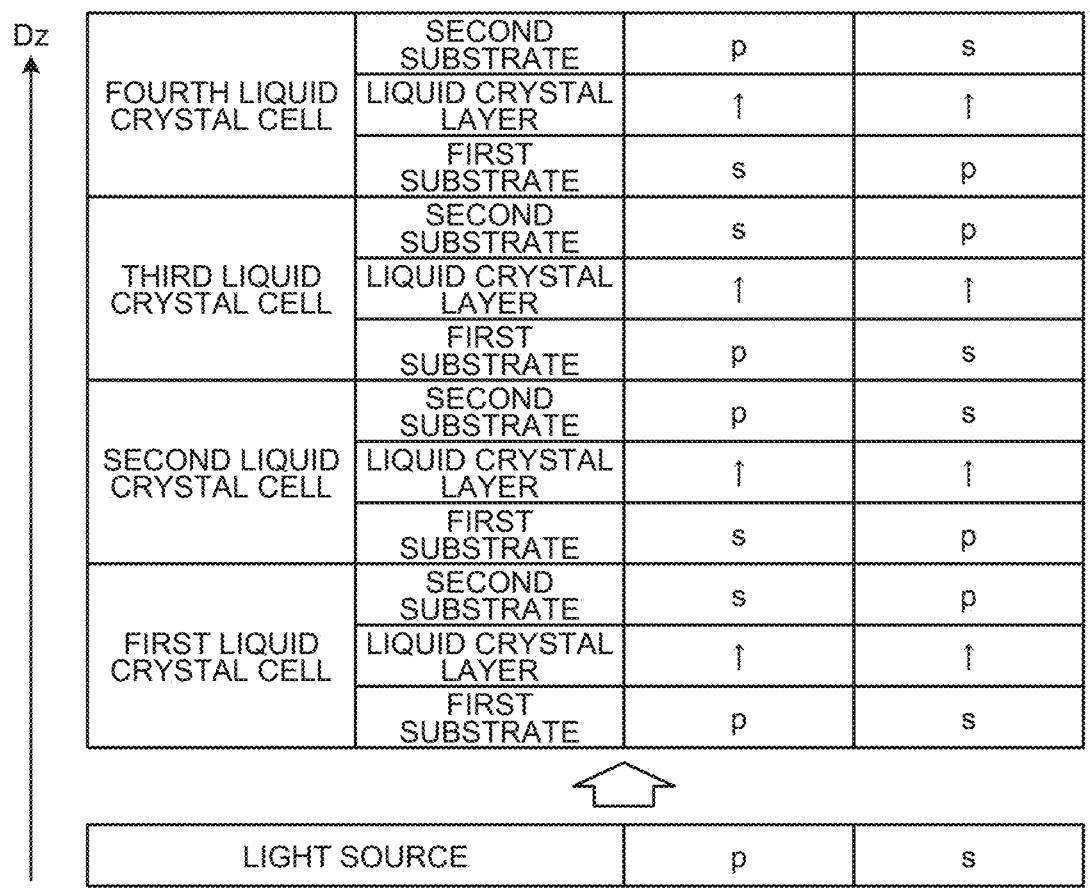
FIG. 8A is a conceptual diagram for description of light shape change through the optical element according to the embodiment.

FIG. 8A illustrates a state in which no potential is generated between adjacent electrodes in each liquid crystal cell 2. In this case, only optical rotation occurs in each liquid crystal cell 2 and no polarized light component is diffused.

Figure 8B:
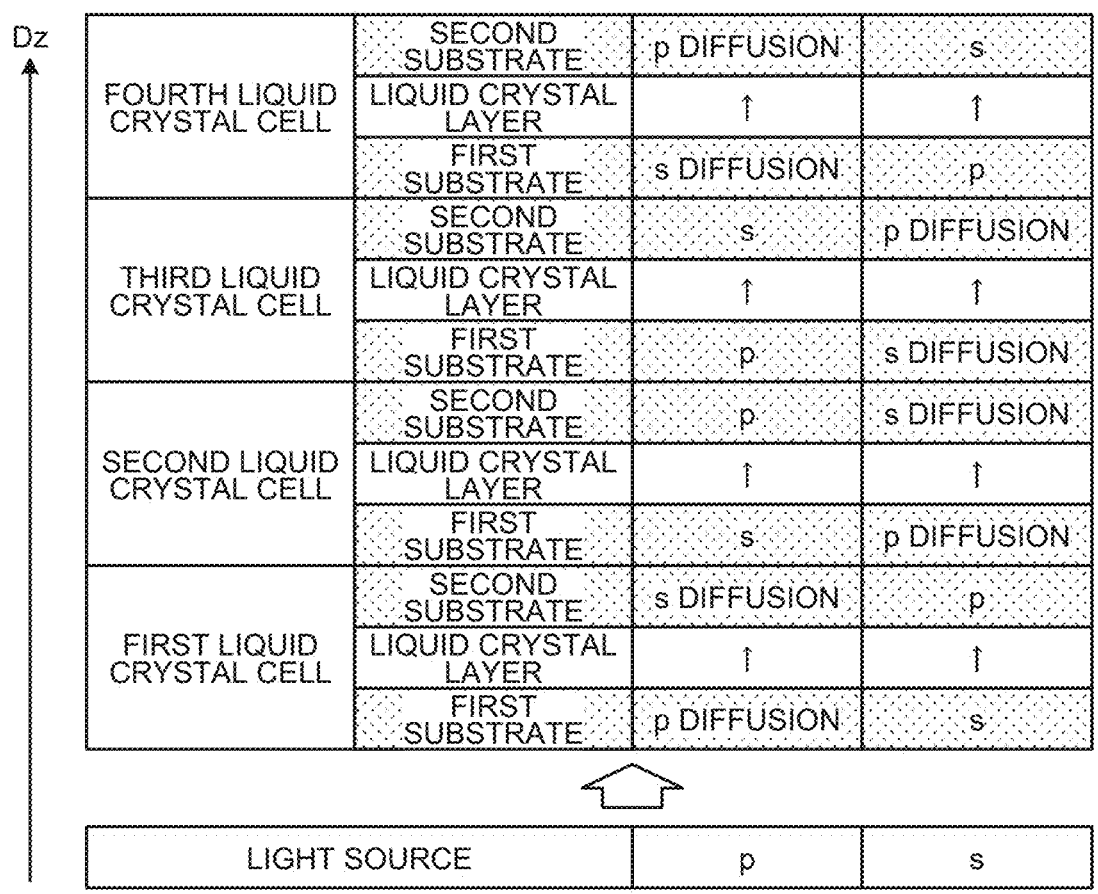
FIG. 8B is a conceptual diagram for description of light shape change through the optical element according to the embodiment.

As illustrated in FIG. 8B, for example, when potential difference is generated between the drive electrodes 10a and 10b on the first substrate 5 side in the first liquid crystal cell 2_1, the liquid crystal molecules between the electrodes are aligned in a circular arc shape, and accordingly, refractive index distribution is formed in the Dx direction in the liquid crystal layer 8. As light from the light source 4 passes through in this state, the above-described refractive index distribution acts on the polarized light component (in FIG. 8B, p-polarized component) parallel to the Dx direction, and accordingly, the p-polarized component diffuses in the Dx direction.

In addition, when potential difference is generated between the drive electrodes 13a and 13b on the second substrate 6 side in the first liquid crystal cell 2_1, refractive index distribution is formed in the Dy direction on the second substrate 6 side, and accordingly, the s-polarized light component diffuses in the Dy direction on the second substrate 6 side. Specifically, the polarized light component having changed from a p-polarized component to an s-polarized light component during passing through the liquid crystal layer 8 in the first liquid crystal cell 2_1 diffuses in the Dy direction as well. However, the s-polarized light component at incidence on the first liquid crystal cell 2_1 optically rotates during passing through the liquid crystal layer 8 but intersects each refractive index distribution, and accordingly, only optically rotates without diffusing and passes through the first liquid crystal cell 2_1.

The s-polarized light component at incidence on the first liquid crystal cell 2_1 changes to a p-polarized component after passing through the first liquid crystal cell 2_1, and the second liquid crystal cell 2_2 acts on this p-polarized component. Specifically, as illustrated in FIGS. 8A and 8B, the first liquid crystal cell 2_1 acts on the p-polarized component among light incident on the optical element 100, and the second liquid crystal cell 2_2 acts on the s-polarized light component. Since the third liquid crystal cell 2_3 and the fourth liquid crystal cell 2_4 are provided with rotation by 90° relative to the first liquid crystal cell 2_1 and the second liquid crystal cell 2_2, polarized light components on which they act are switched by 90°. Specifically, the third liquid crystal cell 2_3 acts on the s-polarized light component at incidence on the optical element 100, and the fourth liquid crystal cell 2_4 acts on the p-polarized component at incidence on the optical element 100.

Figure 8C:
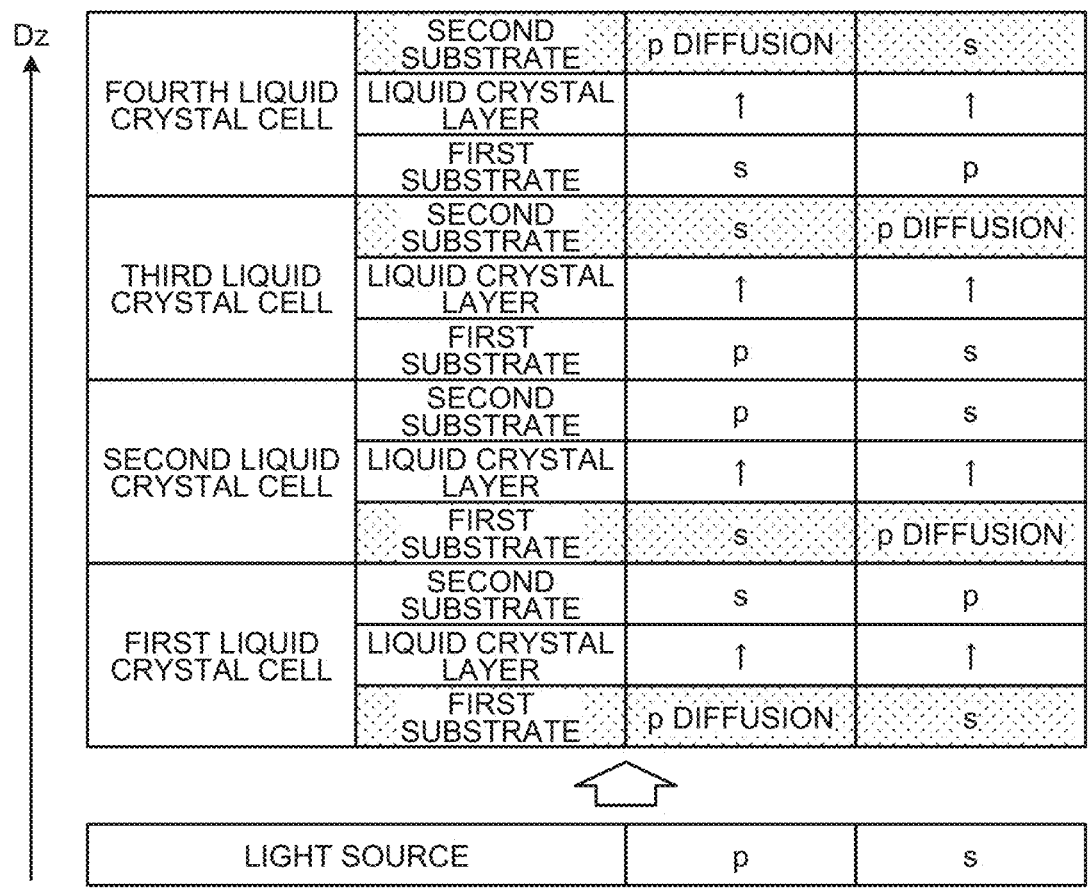
FIG. 8C is a conceptual diagram for description of light shape change through the optical element according to the embodiment.

As illustrated in FIG. 8C, in the optical element, it is possible to act on the p-polarized component by providing potential difference between drive electrodes extending in the Dy direction in each liquid crystal cell 2 (between the drive electrodes 10a and 10b of the first substrate 5 in the first liquid crystal cell 2_1 and the second liquid crystal cell 2_2 and between the drive electrodes 13a and 13b of the second substrate 6 in the third liquid crystal cell 2_3 and the fourth liquid crystal cell 2_4), thereby increasing the shape of light mainly in the Dx direction. This effect may be referred to as horizontal diffusion.

Figure 8D:
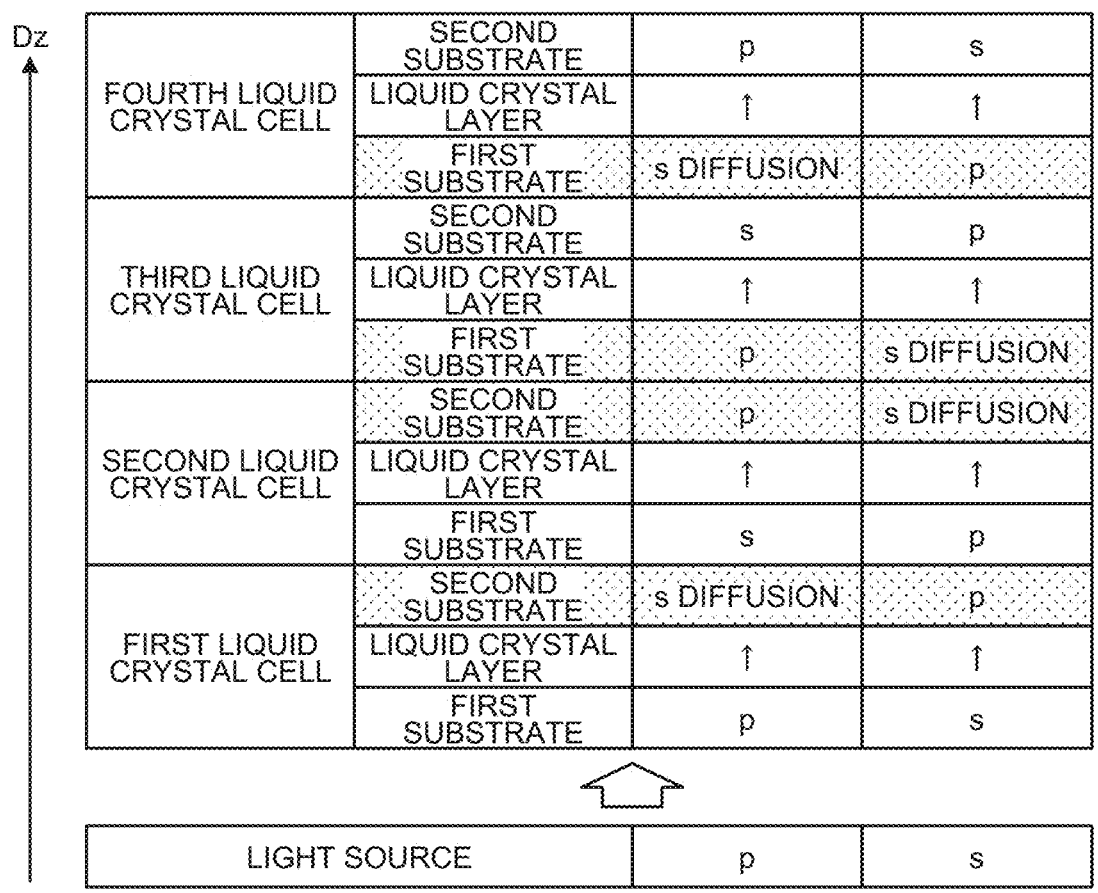
FIG. 8D is a conceptual diagram for description of light shape change through the optical element according to the embodiment.

As illustrated in FIG. 8D, it is possible to act on the s-polarized light component by providing potential difference between drive electrodes extending in the Dx direction in each liquid crystal cell 2 (between the drive electrodes 13a and 13b of the second substrate 6 in the first liquid crystal cell 2_1 and the second liquid crystal cell 2_2 and between the drive electrodes 10a and 10b of the first substrate 5 in the third liquid crystal cell 2_3 and the fourth liquid crystal cell 2_4), thereby increasing the shape of light mainly in the Dy direction. This effect may be referred to as vertical diffusion.

The diffusion degree of light in each direction depends on the potential difference between the drive electrodes 10a and 10b (or between the drive electrodes 13a and 13b) adjacent to each other. The spread of light in the direction is maximum (100 (%)) in a case where the potential difference between the drive electrodes 10a and 10b (or between the drive electrodes 13a and 13b) is maximum potential difference (for example, 30 (V)) defined in advance, and no spread of light (0(%)) occurs in the direction in a case where no potential difference is generated. Alternatively, the spread of light in the direction is 50(%) in a case where the potential difference between the drive electrodes 10a and 10b (or between the drive electrodes 13a and 13b) is 50(%) (for example, 15 (V)) of the above-described maximum potential difference. Note that, in a case where the relation between voltage difference and light spread is not linear, it is possible to set another potential difference instead of 15 (V).

In each liquid crystal cell 2, the interval (is also referred to as a cell gap) between its substrates (between the first substrate 5 and the second substrate 6) is large at 30 μm to 50 μm approximately, and accordingly, influence of an electric field formed in one of the substrates on the other substrate side is suppressed as much as possible. It goes without saying that drive voltage that generates potential difference between the drive electrodes 10a and 10b (or between the drive electrodes 13a and 13b) adjacent to each other is what is called alternating-current square wave, thereby preventing burn-in of the liquid crystal molecules.

The alignment directions of the alignment films, the extending directions of the drive electrodes on the substrates, and the angle between them may be modified as appropriate for the entire optical element 100 or each liquid crystal cell 2 in accordance with the characteristics of liquid crystals to be employed and optical specifications to be intentionally obtained.

In the present embodiment, description is made on the configuration of the optical element 100 in which the four liquid crystal cells of the first liquid crystal cell 2_1, the second liquid crystal cell 2_2, the third liquid crystal cell 2_3, and the fourth liquid crystal cell 2_4 are stacked, but the optical element 100 is not limited to this configuration and may employ, for example, a configuration in which two or three liquid crystal cells 2 are stacked or a configuration in which a plurality of liquid crystal cells 2, five or more liquid crystal cells 2, are stacked.

In the present disclosure, in the illumination device 1 with the above-described configuration, light incident on the optical element from the light source 4 is controlled in the two directions of the Dx direction (direction of horizontal diffusion) and the Dy direction (direction of vertical diffusion) by controlling drive voltage of each liquid crystal cell 2. The above-described vertical diffusion and horizontal diffusion may be collectively referred to as light diffusion. Accordingly, the shape of light emitted from the optical element is changed. The shape of light is a light shape that appears on a plane parallel to an emission surface of the optical element, and this may be referred to as a light distribution shape. Hereinafter, control of the light diffusion degree in the present disclosure will be described below with reference to FIG. 9.

Figure 9:
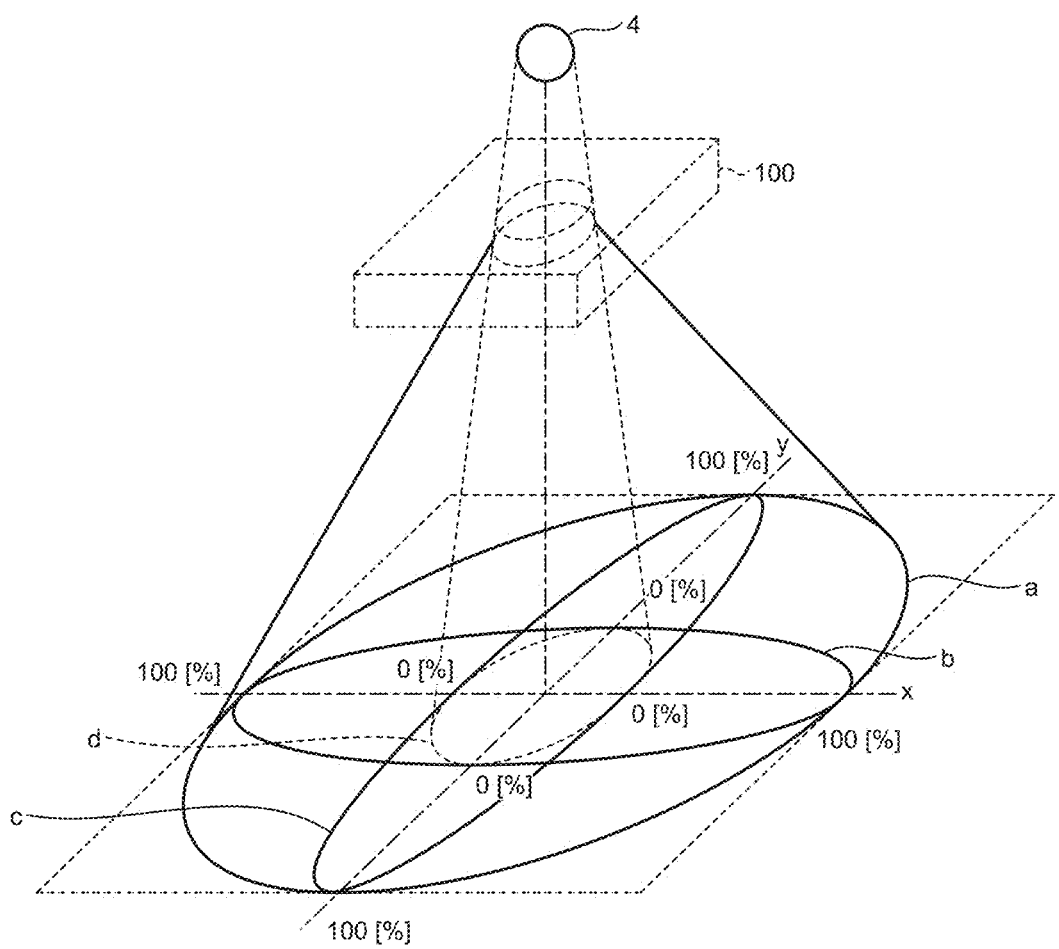
FIG. 9 is a conceptual diagram for conceptually describing light distribution control by the illumination device according to the embodiment.

FIG. 9 is a conceptual diagram for conceptually describing control of the light diffusion degree of the illumination device according to the embodiment. FIG. 9 illustrates an irradiation area of light on a virtual plane xy orthogonal to the Dz direction. The outline of the actual irradiation area is slightly unclear depending on the distance from the light source 4, a light diffraction phenomenon, and the like.

As described above, the alignment direction of the liquid crystal molecules 17 in the liquid crystal layer 8 is controlled as drive voltage is supplied to the drive electrodes 10 and 13 of each liquid crystal cell 2 of the optical element 100 provided on the optical axis of the light source 4. Accordingly, the light distribution shape of light emitted from the optical element 100 is controlled.

Specifically, for example, the light distribution shape in the Dx direction changes in accordance with drive voltage applied to the drive electrodes 10 or drive electrodes 13 extending in the Dy direction in each liquid crystal cell 2 as described above. Such light diffusion in the Dx direction may be referred to as the horizontal diffusion. The light distribution shape in the Dy direction changes in accordance with drive voltage applied to the drive electrodes 10 or drive electrodes 13 extending in the Dx direction in the first to fourth liquid crystal cells. Such light diffusion in the Dy direction may be referred to as the vertical diffusion.

In the present disclosure, the minimum diffusion degrees of the horizontal diffusion and the vertical diffusion are 0(%) and the maximum diffusion degrees thereof are 100(%). More specifically, in a case where the horizontal diffusion degree is 0(%), drive electrodes (for example, the drive electrodes 10 extending in the Dy direction on the first substrate 5 in the first liquid crystal cell 2_1) functioning to expand the light distribution state in the Dx direction do not act on the refractive index distribution of the liquid crystal layer 8. In this case, no potential difference is present between the adjacent drive electrodes 10*a* and 10*b* or no potential is supplied to the electrodes. On the other hand, in a case where the horizontal diffusion degree is 100(%), drive electrodes (for example, the drive electrodes 10 extending in the Dy direction on the first substrate 5 in the first liquid crystal cell 2_1) functioning to expand the light distribution state in the Dx direction maximally act on the refractive index distribution of the liquid crystal layer 8. In this case, the potential difference between the adjacent drive electrodes 10*a* and 10*b* is set to the maximum potential difference (for example, 30 (V)) in the optical element 100. In a case where the horizontal diffusion degree is larger than 0(%) and smaller than 100(%), potential for which the potential difference between the adjacent drive electrodes 10*a* and 10*b* is adjusted to be larger than 0 (V) and smaller than the maximum potential difference (for example, 30 (V)) is applied to the electrodes. The same applies to the vertical diffusion.

Outline "a" illustrated in FIG. 9 exemplarily indicates the irradiation area in a case where the horizontal diffusion degree and the vertical diffusion degree are both 100(%). Outline "b" illustrated in FIG. 9 exemplarily indicates the irradiation area in a case where the horizontal diffusion degree is 100(%) and the vertical diffusion degree is 0(%). Outline "c" illustrated in FIG. 9 exemplarily indicates the irradiation area in a case where the horizontal diffusion degree is 0(%) and the vertical diffusion degree is 100(%). Outline "d" illustrated in FIG. 9 exemplarily indicates the irradiation area in a case where the horizontal diffusion degree and the vertical diffusion degree are both 0(%). In other words, outline "d" indicates the light distribution state when light from the light source 4 is emitted without being controlled by the optical element 100 (or simply transmitting through the optical element 100).

In this manner, in the illumination device 1 with the above-described configuration, it is possible to control the horizontal and vertical diffusion degrees of emission light from the optical element 100 by performing drive voltage control of each liquid crystal cell 2. Accordingly, it is possible to change the light distribution shape of emission light from the illumination device 1. Hereinafter, control that changes the light distribution shape of emission light from the illumination device 1 is also referred to as "light distribution control".

Note that the illumination device 1 capable of light distribution control in the two directions of the Dx and Dy directions is exemplarily described in the present disclosure, but controllable parameters of the illumination device 1 is not limited to light distribution (light spread). For example, the illumination device 1 may be capable of light adjustment control. In this case, controllable parameters of the illumination device 1 may include light adjustment (brightness).

The following describes configurations and operation with which the light distribution state in the two directions of the Dx and Dy directions by using 1/f fluctuation is dynamically controllable for the illumination device 1 capable of light distribution control in the two directions of the Dx and Dy directions.

In the following description, dynamic light distribution control by using 1/f fluctuation is also simply referred to as "fluctuation control". In addition, "dynamic light distribution control by using 1/f fluctuation" in the present disclosure means control that changes fluctuation size (light distribution shape) with temporal change. In other words, "dynamic light distribution control by using 1/f fluctuation" in the present disclosure means control that changes the light distribution shape over time due to 1/f fluctuation. Note that in the following description, the Dx direction is referred to as an H direction (first direction), and the Dy direction is referred to as a V direction (second direction).

First Embodiment

Figures 10, 11:
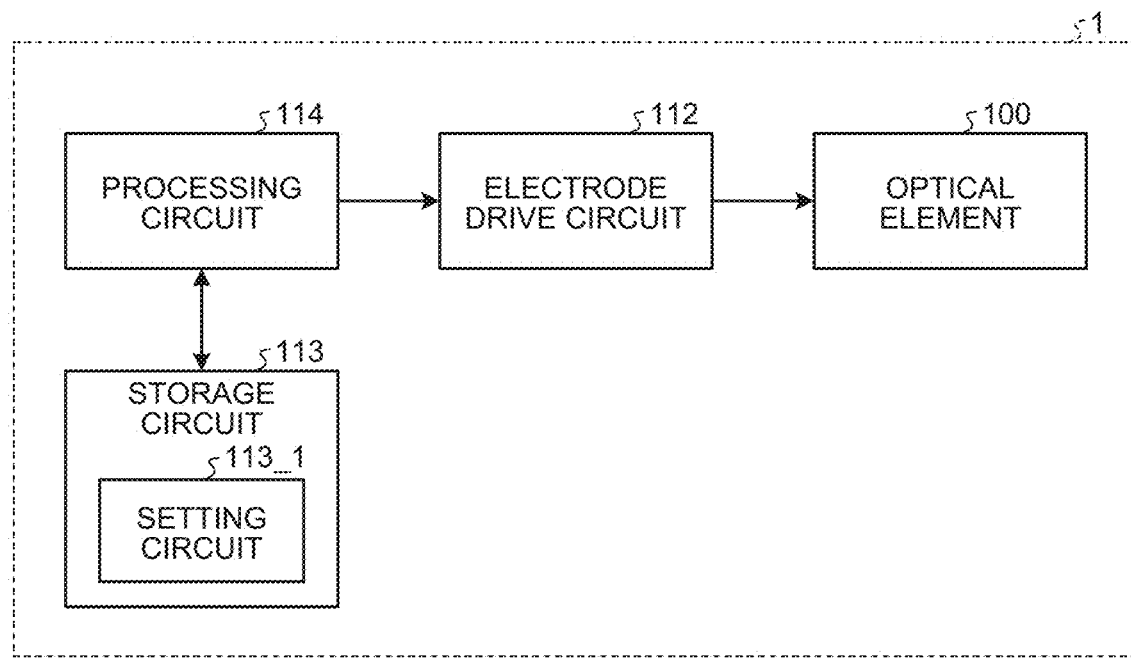
FIG. 10 is a diagram illustrating an example of a control block configuration of an illumination device according to a first embodiment.
FIG. 11 is a diagram illustrating an example of the correspondence relation between a state value of a setting circuit and setting values.

FIG. 10 is a diagram illustrating an example of a control block configuration of the illumination device according to a first embodiment. As illustrated in FIG. 10, the illumination device 1 according to the embodiment includes an electrode drive circuit 112, a storage circuit 113, and a processing circuit 114 as control blocks for controlling the optical element 100 described above. The processing circuit 114 is constituted by a microcomputer for executing light distribution control and light adjustment control of the illumination device 1.

The electrode drive circuit 112 supplies drive voltage to the drive electrodes 10 and 13 of each liquid crystal cell 2 of the optical element 100 based on the result of processing at the processing circuit 114. The processing at the processing circuit 114 will be described later.

The storage circuit 113 includes, for example, an internal memory mounted in the microcomputer constituting the processing circuit 114. In the present disclosure, a light distribution setting value S0h in the H direction and a light distribution setting value S0v in the V direction for the illumination device 1 are stored in a storage region of the storage circuit 113. Note that in the following description, the direction of horizontal diffusion is the H direction, and the diffusion degree in the horizontal direction (horizontal diffusion degree) is the light distribution setting value in the H direction. Similarly, the direction of vertical diffusion is the V direction, and the diffusion degree in the vertical direction (vertical diffusion degree) is the light distribution setting value in the V direction.

The light distribution setting value S0h in the H direction and the light distribution setting value S0v in the V direction, which are stored in the storage region of the storage circuit 113 may be, for example, setting values stored in the storage region of the storage circuit 113 during the previous operation of the illumination device 1 or may be transmitted from a non-illustrated control device and stored in the storage region of the storage circuit 113.

In the present disclosure, intermediate data of the processing at the processing circuit 114 is temporarily stored in the storage region of the storage circuit 113.

The storage circuit 113 includes a setting circuit 113_1 for setting setting items such as enabling or disabling fluctuation control and a fluctuation width defining the change width of light distribution values due to fluctuation control.

In the present disclosure, the setting circuit 113_1 is, for example, a dual in-line package switch (DIP switch) capable of setting setting items. In this case, the setting circuit 113_1 includes, for example, a plurality of switch circuits with two states of "0" and "1".

FIG. 11 is a diagram illustrating an example of the correspondence relation between a state value of the setting circuit and the setting values. In the example illustrated in FIG. 11, the setting circuit 113_1 includes four switch circuits and is configured such that the higher two bits enable or disable fluctuation control and the lower two bits allow setting the fluctuation width.

In the example illustrated in FIG. 11, enabling or disabling of fluctuation control of light adjustment (brightness) (light adjustment fluctuation control) and the fluctuation width are designated as setting value items in addition to fluctuation control of light distribution (light spread) (light distribution fluctuation control).

In the example illustrated in FIG. 11, when the higher two bits of the state value of the setting circuit 113_1 are "00", the light adjustment fluctuation control and the light distribution fluctuation control are both disabled. When the higher two bits of the state value of the setting circuit 113_1 are "01", the light adjustment fluctuation control is enabled and the light distribution fluctuation control is disabled. When the higher two bits of the state value of the setting circuit 113_1 are "10", the light adjustment fluctuation control is disabled and the light distribution fluctuation control is enabled. When the higher two bits of the state value of the setting circuit 113_1 are "11", the light adjustment fluctuation control and the light distribution fluctuation control are both enabled. Note that, in the example illustrated in FIG. 11, the lower two bits "**" when the light adjustment fluctuation control and the light distribution fluctuation control are both disabled (the higher two bits are "00") are arbitrary values.

In the example illustrated in FIG. 11, the light adjustment fluctuation width when the light adjustment fluctuation control is enabled (the higher two bits are "01") is "5(%)" when the lower two bits of the state value of the setting circuit 113_1 are "00". The light adjustment fluctuation width is "10(%)" when the lower two bits of the state value of the setting circuit 113_1 are "01". The light adjustment fluctuation width is "20(%)" when the lower two bits of the state value of the setting circuit 113_1 are "10". The light adjustment fluctuation width is "30(%)" when the lower two bits of the state value of the setting circuit 113_1 are "11".

In the example illustrated in FIG. 11, the light distribution fluctuation width when the light distribution fluctuation control is enabled (the higher two bits are "10") is "5(%)" when the lower two bits of the state value of the setting circuit 113_1 are "00". The light distribution fluctuation width is "10(%)" when the lower two bits of the state value of the setting circuit 113_1 are "01". The light distribution fluctuation width is "20(%)" when the lower two bits of the state value of the setting circuit 113_1 are "10". The light distribution fluctuation width is "30(%)" when the lower two bits of the state value of the setting circuit 113_1 are "11".

In the example illustrated in FIG. 11, the light adjustment fluctuation width and the light distribution fluctuation width when the light adjustment fluctuation control and the light distribution fluctuation control are both enabled (the higher two bits are "11") are "5(%)" when the lower two bits of the state value of the setting circuit 113_1 are "00". The light adjustment fluctuation width and the light distribution fluctuation width are "10(%)" when the lower two bits of the state value of the setting circuit 113_1 are "01". The light adjustment fluctuation width and the light distribution fluctuation width are "20(%)" when the lower two bits of the state value of the setting circuit 113_1 are "10". The light adjustment fluctuation width and the light distribution fluctuation width are "30(%)" when the lower two bits of the state value of the setting circuit 113_1 are "11".

Note that the number of switches of the setting circuit 113_1 is not limited to that described above. Specifically, the number of options for the fluctuation width can be increased by setting the number of switches for setting the fluctuation width to three or more, for example. Moreover, for example, the light distribution fluctuation width in the H direction and the light distribution fluctuation width in the V direction in the light distribution fluctuation control may be able to be set to values different from each other. In this case, for example, the summed value of the light distribution fluctuation width in the H direction and the light distribution fluctuation width in the V direction in the light distribution fluctuation control may be a predetermined value (for example, 100(%)), or only either of the light distribution fluctuation width in the H direction and the light distribution fluctuation width in the V direction in the light distribution fluctuation control may be able to be set.

In the present embodiment, the following description will be made on the light distribution fluctuation control, and description of the light adjustment fluctuation control is omitted. In a configuration for performing only the light distribution fluctuation control, the number of switches of the setting circuit 113_1 for setting enabling or disabling of fluctuation control may be one, with "0" for disabling fluctuation control and "1" for enabling fluctuation control.

The state value of the setting circuit 113_1 may be stored in the storage region of the storage circuit 113. In this case, setting items such as enabling or disabling fluctuation control and the fluctuation width in fluctuation control may have, for example, setting values stored in the storage region of the storage circuit 113 during the previous operation of the illumination device 1 or may be transmitted from a control device (control device 200; refer to FIGS. 17 to 21) according to a second embodiment to be described later and stored in the storage region of the storage circuit 113.

Figure 12:
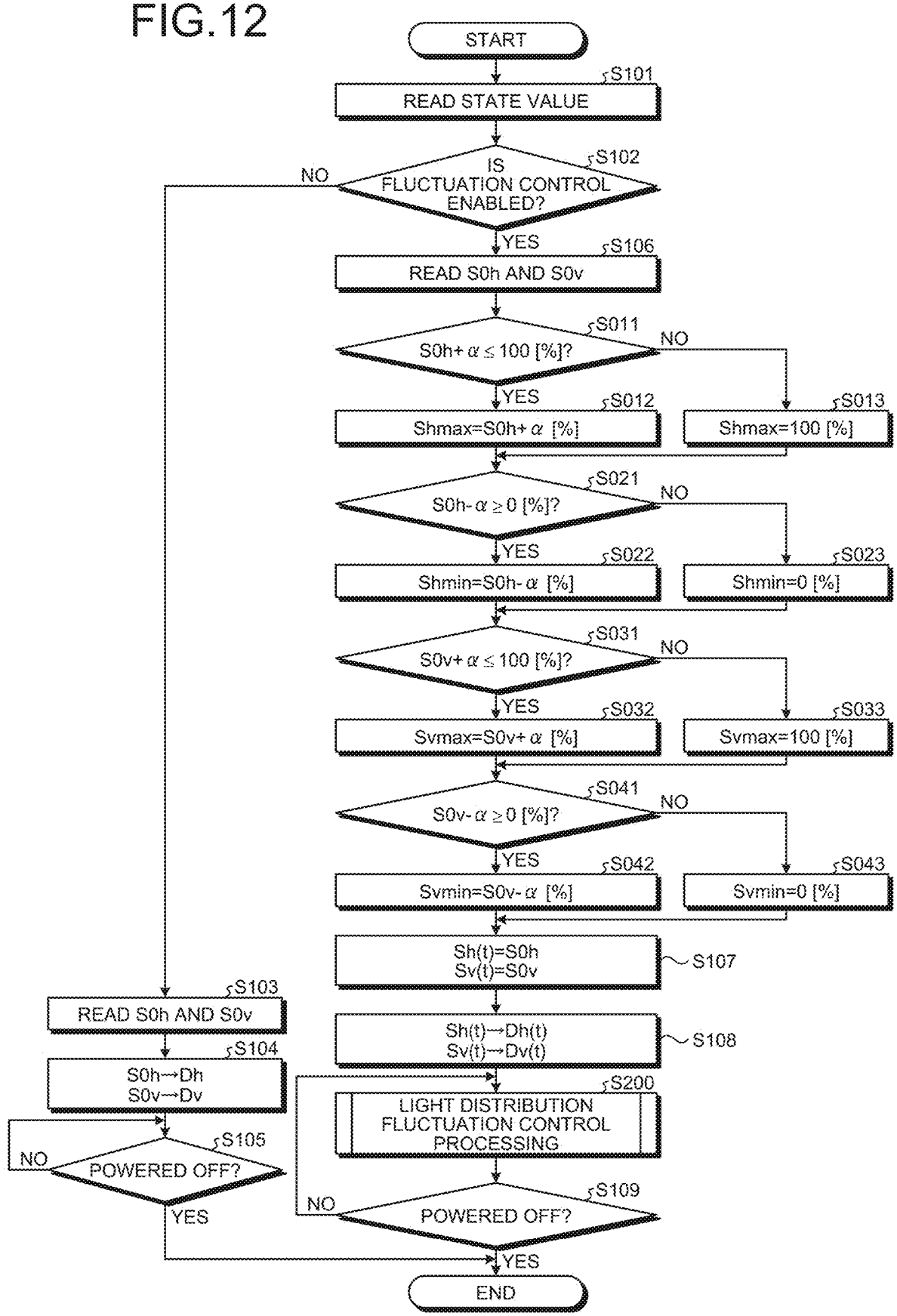
FIG. 12 is a flowchart illustrating an example of light distribution control processing at the illumination device according to the first embodiment.

The processing circuit 114 executes light distribution control processing described below. FIG. 12 is a flowchart illustrating an example of the light distribution control processing at the illumination device according to the first embodiment.

At activation of the illumination device 1, the processing circuit 114 reads a state value from the setting circuit 113_1 of the storage circuit 113 (step S101) and determines whether fluctuation control is enabled based on the state value (step S102). Specifically, the processing circuit 114 reads the state value of the setting circuit 113_1 and determines that fluctuation control is enabled when the higher two bits of the state value are "10". The processing circuit 114 determines that fluctuation control is disabled in a case where the higher two bits of the state value are "00". Description of cases where the higher two bits of the state value are "01" or "11" is omitted here.

In a case where fluctuation control is disabled (No at step S102), specifically, in a case where the higher two bits of the setting circuit 113_1 are "00", the processing circuit 114 reads the light distribution setting value S0*h* in the H direction and the light distribution setting value S0*v* in the V direction, which are stored in the storage region of the storage circuit 113 (step S103), converts the light distribution setting value S0*h* and the light distribution setting value S0*v*, which are expressed as percentages from 0(%) to 100(%) into light distribution gradation values Dh and Dv, respectively, of the optical element 100 (step S104), and outputs the light distribution gradation values Dh and Dv to the electrode drive circuit 112. The light distribution gradation value Dh in the H direction is represented by Expression (1) below. The light distribution gradation value Dv in the V direction is represented by Expression (2) below.

$$Dh = S0h \times \text{Gradation}/100 \quad (1)$$

$$Dv = S0v \times \text{Gradation}/100 \quad (2)$$

The light distribution gradation of the optical element 100 is set to, for example, "255". In this case, the light distribution gradation values Dh and Dv are 8-bit data. The light distribution gradation of the optical element 100 is not limited to "255". In other words, the light distribution gradation values Dh and Dv are not limited to 8-bit data. The present disclosure is not limited by the light distribution gradation of the optical element 100.

The electrode drive circuit 112 supplies drive voltage in accordance with the light distribution gradation values Dh and Dv output from the processing circuit 114 to the drive electrodes 10 and 13 of each liquid crystal cell 2 of the optical element 100. Accordingly, the light distribution state is controlled in accordance with the light distribution setting value S0*h* in the H direction and the light distribution setting value S0*v* in the V direction.

The processing circuit 114 determines whether the illumination device 1 is powered off by control (step S105), and repeatedly executes processing at step S105 in a case where the illumination device 1 is not powered off by control (No at step S105), or ends the light distribution control processing in a case where the illumination device 1 is powered off by control (Yes at step S105).

In a case where fluctuation control is enabled (Yes at step S102), specifically, in a case where the higher two bits of the setting circuit 113_1 are "10", the processing circuit 114 reads the light distribution setting value S0*h* in the H direction and the light distribution setting value S0*v* in the V direction, which are stored in the storage region of the storage circuit 113 (step S106), and sets a fluctuation range defined as a change range of light distribution values in light distribution fluctuation control processing to be described later. Hereinafter, the light distribution setting value S0*h* in the H direction and the light distribution setting value S0*v* in the V direction, which are stored in the storage region of the storage circuit 113 are also referred to as "initial setting values".

Specifically, in a case where the lower two bits of the read state value are "00", the processing circuit 114 sets lower and upper limit values of the fluctuation range of light distribution values with a fluctuation width $\alpha$ as 5(%).

In a case where the lower two bits of the read state value are "01", the processing circuit 114 sets lower and upper limit values of the fluctuation range of light distribution values with the fluctuation width $\alpha$ as 10(%).

In a case where the lower two bits of the read state value are "10", the processing circuit 114 sets lower and upper limit values of the fluctuation range of light distribution values with the fluctuation width $\alpha$ as 20(%).

In a case where the lower two bits of the read state value are "11", the processing circuit 114 sets lower and upper limit values of the fluctuation range of light distribution values with the fluctuation width $\alpha$ as 30(%).

First, an upper limit value Shmax of the fluctuation range of a light distribution value Sh for the light distribution setting value S0*h* in the H direction is set (steps S01*l* to S013).

The processing circuit 114 determines whether a value obtained by adding the fluctuation width $\alpha$ to the light distribution setting value S0*h* in the H direction is equal to or smaller than 100(%) (step S011). In a case where the value obtained by adding the fluctuation width $\alpha$ to the light distribution setting value S0*h* is equal to or smaller than 100(%) (Yes at step S011), the processing circuit 114 sets the upper limit value Shmax of the fluctuation range of the light distribution value Sh for the light distribution setting value S0*h* to S0*h*+$\alpha$ (%) (step S012), and stores the upper limit value Shmax in the storage region of the storage circuit 113. In a case where the value obtained by adding the fluctuation width $\alpha$ to the light distribution setting value S0*h* exceeds 100(%) (No at step S011), the processing circuit 114 sets the upper limit value Shmax of the fluctuation range of the light distribution value Sh for the light distribution setting value S0*h* to 100(%) (step S013), and stores the upper limit value Shmax in the storage region of the storage circuit 113.

Subsequently, a lower limit value Shmin of the fluctuation range of the light distribution value Sh for the light distribution setting value S0*h* in the H direction is set (steps S021 to S023).

The processing circuit 114 determines whether a value obtained by subtracting the fluctuation width α from the light distribution setting value S0h in the H direction is equal to or larger than 0(%) (step S021). In a case where the value obtained by subtracting the fluctuation width α from the light distribution setting value S0h is equal to or larger than 0(%) (Yes at step S021), the processing circuit 114 sets the lower limit value Shmin of the fluctuation range of the light distribution value Sh for the light distribution setting value S0h to S0h-α (%) (step S022), and stores the lower limit value Shmin in the storage region of the storage circuit 113. In a case where the value obtained by subtracting the fluctuation width α from the light distribution setting value S0h is smaller than 0(%) (No at step S021), the processing circuit 114 sets the lower limit value Shmin of the fluctuation range of the light distribution value Sh for the light distribution setting value S0h to 0(%) (step S023), and stores the lower limit value Shmin in the storage region of the storage circuit 113.

Subsequently, an upper limit value Svmax of the fluctuation range of a light distribution value Sv for the light distribution setting value S0v in the V direction is set (steps S031 to S033).

The processing circuit 114 determines whether a value obtained by adding the fluctuation width α to the light distribution setting value S0v in the V direction is equal to or smaller than 100(%) (step S031). In a case where the value obtained by adding the fluctuation width α to the light distribution setting value S0v is equal to or smaller than 100(%) (Yes at step S031), the processing circuit 114 sets the upper limit value Svmax of the fluctuation range of the light distribution value Sv for the light distribution setting value S0v to S0v+a (%) (step S032), and stores the upper limit value Svmax in the storage region of the storage circuit 113. In a case where the value obtained by adding the fluctuation width α to the light distribution setting value S0v exceeds 100(%) (No at step S031), the processing circuit 114 sets the upper limit value Svmax of the fluctuation range of the light distribution value Sv for the light distribution setting value S0v to 100(%) (step S033), and stores the upper limit value Svmax in the storage region of the storage circuit 113.

Subsequently, a lower limit value Svmin of the fluctuation range of the light distribution value Sv for the light distribution setting value S0v in the V direction is set (steps S041 to S043).

The processing circuit 114 determines whether a value obtained by subtracting the fluctuation width α from the light distribution setting value S0v in the V direction is equal to or larger than 0(%) (step S041). In a case where the value obtained by subtracting the fluctuation width α from the light distribution setting value S0v is equal to or larger than 0(%) (Yes at step S041), the processing circuit 114 sets the lower limit value Svmin of the fluctuation range of the light distribution value Sv for the light distribution setting value S0v to S0v-α (%) (step S042), and stores the lower limit value Svmin in the storage region of the storage circuit 113. In a case where the value obtained by subtracting the fluctuation width α from the light distribution setting value S0v is smaller than 0(%) (No at step S041), the processing circuit 114 sets the lower limit value Svmin of the fluctuation range of the light distribution value Sv for the light distribution setting value S0v to 0(%) (step S043), and stores the lower limit value Svmin in the storage region of the storage circuit 113.

Then, the processing circuit 114 sets the light distribution setting value S0h in the H direction as a first light distribution value Sh(t) at a time point t, sets the light distribution setting value S0v in the V direction as a first light distribution value Sv(t) at the time point t, and stores them in the storage region of the storage circuit 113 (Sh(t)=S0h and Sv(t)=S0v; step S107).

The execution order of the above-described setting processing (steps S011 to S013) of the upper limit value Shmax of the fluctuation range of the light distribution value Sh, setting processing (steps S021 to S023) of the lower limit value Shmin of the fluctuation range of the light distribution value Sh, setting processing (steps S031 to S033) of the upper limit value Svmax of the fluctuation range of the light distribution value Sv, and setting processing (steps S041 to S043) of the lower limit value Svmin of the fluctuation range of the light distribution value Sv is not limited to that described above. These pieces of setting processing may be processed in parallel.

Subsequently, as preprocessing for executing the light distribution fluctuation control processing (step S200) to be described later, the processing circuit 114 converts the first light distribution value Sh(t) in the H direction and the first light distribution value Sv(t) in the V direction, which are expressed as percentages from 0(%) to 100(%), into light distribution gradation values Dh(t) and Dv(t), respectively, in the optical element 100, and outputs the light distribution gradation values Dh(t) and Dv(t) to the electrode drive circuit 112 (step S108). The light distribution gradation value Dh(t) in the H direction is represented by Expression (3) below. The light distribution gradation value Dv(t) in the V direction is represented by Expression (4) below.

$$Dh(t) = Sh(t) \times \text{Gradation}/100 \qquad (3)$$

$$Dv(t) = Sv(t) \times \text{Gradation}/100 \qquad (4)$$

The electrode drive circuit 112 supplies drive voltage in accordance with the light distribution gradation values Dh(t) and Dv(t) output from the processing circuit 114 to the drive electrodes 10 and 13 of each liquid crystal cell 2 of the optical element 100. Accordingly, the light distribution state is controlled in accordance with the initial setting values (the light distribution setting value S0h in the H direction and the light distribution setting value S0v in the V direction) stored in the storage region of the storage circuit 113.

Figure 13:
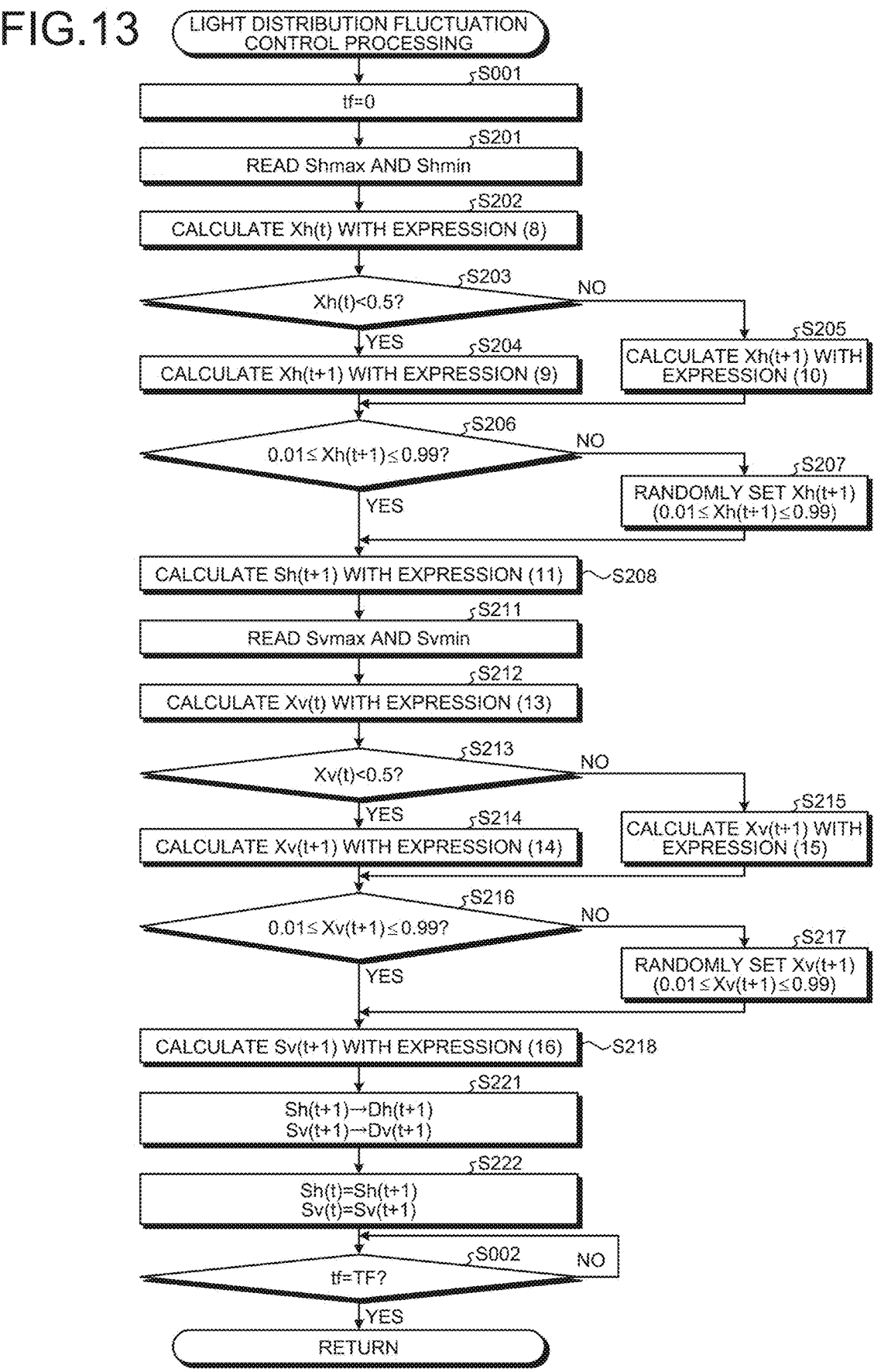
FIG. 13 is a sub flowchart illustrating an example of light distribution fluctuation control processing at the illumination device according to the first embodiment.

After outputting, to the electrode drive circuit 112, the light distribution gradation values Dh(t) and Dv(t) corresponding to the initial setting values (the light distribution setting value S0h (=Sh(t) in the H direction) and the light distribution setting value S0v (=Sv(t) in the V direction)) stored in the storage region of the storage circuit 113 (step S108), the processing circuit 114 executes the light distribution fluctuation control processing (step S200). FIG. 13 is a sub flowchart illustrating an example of the light distribution fluctuation control processing at the illumination device according to the first embodiment. The sub flowchart illustrated in FIG. 13 corresponds to the light distribution fluctuation control processing (step S200) in the light distribution control processing illustrated in FIG. 12.

In the present disclosure, the Intermittent Chaos Method is used as an algorithm for achieving dynamic light distribution control by using 1/f fluctuation. In the Intermittent Chaos Method, a variable X(t+1) at a time point t+1 is indicated by a variable X(t) (however 0.0≤X(t)≤1.0) at the time point t. More specifically, the variable X(t+1) at the time point t+1 is represented by Expression (5) below in the case of 0.0 X(t)≤0.5 or by Expression (6) below in the case of 0.5 X(t)≤1.0. In Expressions (5) and (6) below, the variable X(t+1) is a target value at the time point t+1 after the time point t. In the present disclosure, the execution interval (in other words, time from the time point t to the time point t+1) of the light distribution fluctuation control processing is, for example, 100 (ms). The present disclosure is not limited by the execution interval of the light distribution fluctuation control processing.

$$X(t+1) = X(t) + 2 \times X(t)^2 \qquad (5)$$

$$X(t+1) = X(t) + 2 \times (1 - X(t))^2 \qquad (6)$$

The execution interval of the light distribution fluctuation control processing (step S200) is subjected to timing control with a timer value tf. Specifically, a timeout value TF of the timer value tf corresponds to the execution interval of the light distribution fluctuation control processing. The timer value tf is reset at start of the light distribution fluctuation control processing.

The processing circuit 114 resets the timer value tf of the light distribution fluctuation control processing at start of the light distribution fluctuation control processing (tf=0; step S001).

First, a second light distribution value Sh(t+1) that is a light distribution target value in the H direction at the time point t+1 is set. The first light distribution value Sh(t) in the H direction at the time point t is defined by Expression (7) below with a first variable Xh(t) in the H direction as the variable X(t) at the time point t in the Intermittent Chaos Method.

$$Sh(t) = Shmin + (Shmax - Shmin) \times Xh(t) \qquad (7)$$

The processing circuit 114 reads the upper limit value Shmax and the lower limit value Shmin of the fluctuation range of the light distribution value Sh, which are stored in the storage region of the storage circuit 113 (step S201), and calculates the first variable Xh(t) at the time point t by using Expression (8) below, which is rearranged from Expression (7) above (step S202). Expression (8) below is stored in, for example, the storage region of the storage circuit 113.

$$Xh(t) = (Sh(t) - Shmin)/(Shmax - Shmin) \qquad (8)$$

Subsequently, the processing circuit 114 calculates a second variable Xh(t+1) in the H direction at the time point t+1. Specifically, the processing circuit 114 determines whether the first variable Xh(t) in the H direction, which is calculated at step S202 is smaller than 0.5 (step S203), and in the case of Xh(t)<0.5 (Yes at step S203), calculates the second variable Xh(t+1) in the H direction at the time point t+1 by using Expression (9) below, which is rearranged from Expression (5) above (step S204). In the case of Xh(t)≥0.5 (No at step S203), the processing circuit 114 calculates the second variable Xh(t+1) in the H direction at the time point t+1 by using Expression (10) below, which is rearranged from Expression (6) above (step S205). Expressions (9) and (10) below are stored in, for example, the storage region of the storage circuit 113.

$$Xh(t+1) = Xh(t) + 2 \times Xh(t)^2 \qquad (9)$$

$$Xh(t+1) = Xh(t) - 2 \times (1 - Xh(t))^2 \qquad (10)$$

The processing circuit 114 determines whether the second variable Xh(t+1) in the H direction, which is calculated at step S204 or S205 is equal to or larger than 0.01 and equal to or smaller than 0.99 (step S206). In the case of 0.01≤Xh(t+1) 0.99 (Yes at step S206), the processing circuit 114 proceeds to processing at step S208. In a case where the second variable Xh(t+1) in the H direction is smaller than 0.01 (0≤Xh(t+1)<0.01) or larger than 0.99 (0.99<Xh(t+1) ≤1.0) (No at step S206), the processing circuit 114 sets the second variable Xh(t+1) in the H direction to a random value in the range of 0.01 to 0.99 inclusive (step S207), and proceeds to processing at step S208. Specifically, the processing circuit 114 sets the second variable Xh(t+1) in the H direction to a random value of 0.01 to 0.99 by using a random number table or the like stored in, for example, the storage region of the storage circuit 113. With processing at steps S206 and S207, it is possible to prevent the second variable Xh(t+1) in the H direction from staying at 0.0 or 1.0.

The processing circuit 114 applies the second variable Xh(t+1) in the H direction, which is obtained through processing at steps S203 to S207, to Expression (11) below, which is rearranged from Expression (7) above, calculates the second light distribution value Sh(t+1) that is the light distribution target value in the H direction at the time point t+1, and stores the second light distribution value Sh(t+1) in the storage region of the storage circuit 113 (step S208). Expression (11) below is stored in, for example, the storage region of the storage circuit 113.

$$Sh(t+1) = Shmin + (Shmax - Shmim) \times Xh(t+1) \qquad (11)$$

Subsequently, a second light distribution value Sv(t+1) that is a light distribution target value in the V direction at the time point t+1 is set. The first light distribution value Sv(t) in the V direction at the time point t is represented by Expression (12) below with a first variable Xv(t) in the V direction as the variable X(t) at the time point t in the Intermittent Chaos Method.

$$Sv(t) = Svmin + (Svmax - Svmin) \times Xv(t) \qquad (12)$$

The processing circuit 114 reads the upper limit value Svmax and the lower limit value Svmin of the fluctuation range of the light distribution value Sv, which are stored in the storage region of the storage circuit 113 (step S211), and calculates the first variable Xv(t) at the time point t by using Expression (13) below, which is rearranged from Expression (12) above (step S212). Expression (13) below is stored in, for example, the storage region of the storage circuit 113.

$$Xv(t) = (Sv(t) - Svmin)/(Svmax - Svmin) \qquad (13)$$

Subsequently, the processing circuit 114 calculates a second variable Xv(t+1) at the time point t+1. Specifically, the processing circuit 114 determines whether the first variable Xv(t) in the V direction, which is calculated at step S212 is smaller than 0.5 (step S213), and in the case of Xv(t)<0.5 (Yes at step S213), calculates the second variable Xv(t+1) in the V direction at the time point t+1 by using Expression (14) below, which is rearranged from Expression (5) above (step S214). In the case of Xv(t)≥0.5 (No at step S213), the processing circuit 114 calculates the second variable Xv(t+1) in the V direction at the time point t+1 by using Expression (15) below, which is rearranged from Expression (6) above (step S215). Expressions (14) and (15) below are stored in, for example, the storage region of the storage circuit 113.

$$Xv(t+1) = Xv(t) + 2 \times Xh(t)^2 \quad (14)$$

$$Xv(t+1) = Xv(t) - 2 \times (1 - Xv(t))^2 \quad (15)$$

The processing circuit 114 determines whether the second variable Xv(t+1) in the V direction, which is calculated at step S214 or S215 is equal to or larger than 0.01 and equal to or smaller than 0.99 (step S216). In the case of 0.01≤Xv(t+1)≤0.99 (Yes at step S216), the processing circuit 114 proceeds to processing at step S218. In a case where the second variable Xv(t+1) in the V direction is smaller than 0.01 (0≤Xv(t+1)<0.01) or larger than 0.99 (0.99<Xv(t+1)≤1.0) (No at step S216), the processing circuit 114 sets the second variable Xv(t+1) in the V direction to a random value in the range of 0.01 to 0.99 inclusive (step S217), and proceeds to processing at step S218. Specifically, the processing circuit 114 sets the second variable Xv(t+1) in the V direction to a random value of 0.01 to 0.99 by using a random number table or the like stored in, for example, the storage region of the storage circuit 113. With processing at steps S216 and S217, it is possible to prevent the second variable Xv(t+1) in the V direction from staying at 0.0 or 1.0.

The processing circuit 114 applies the second variable Xv(t+1) obtained through processing at steps S213 to S217 to Expression (16) below, which is rearranged from Expression (12) above, calculates the second light distribution value Sv(t+1) that is a light distribution target value in the V direction at the time point t+1, and stores the second light distribution value Sv(t+1) in the storage region of the storage circuit 113 (step S218). Expression (16) below is stored in, for example, the storage region of the storage circuit 113.

$$Sv(t+1) = +Svmin + (Svmax - Svmin) \times Xv(t+1) \quad (16)$$

Then, the processing circuit 114 converts the second light distribution value Sh(t+1) in the H direction and the second light distribution value Sv(t+1) in the V direction, which are expressed as percentages from 0(%) to 100(%), into light distribution gradation values Dh(t+1) and Dv(t+1), respectively, in the optical element 100 (step S221), and outputs the light distribution gradation values Dh(t+1) and Dv(t+1) to the electrode drive circuit 112. The light distribution gradation value Dh(t+1) in the H direction is represented by Expression (17) below. The light distribution gradation value Dv(t+1) in the V direction is represented by Expression (18) below.

$$Dh(t+1) = Sh(t+1) \times \text{Gradation}/100 \quad (17)$$

$$Dv(t+1) = Sv(t+1) \times \text{Gradation}/100 \quad (18)$$

The electrode drive circuit 112 supplies drive voltage in accordance with the light distribution gradation values Dh(t+1) and Dv(t+1) output from the processing circuit 114 to the drive electrodes 10 and 13 of each liquid crystal cell 2 of the optical element 100. Accordingly, the light distribution state is controlled in accordance with the second light distribution value Sh(t+1) in the H direction and the second light distribution value Sv(t+1) in the V direction.

Then, the processing circuit 114 updates the second light distribution value Sh(t+1), which is a light distribution target value in the H direction at the time point t+1, as a new first light distribution value Sh(t) in the H direction at the time point t, updates the second light distribution value Sv(t+1), which is a light distribution target value in the V direction at the time point t+1, as a new first light distribution value Sv(t) in the V direction at the time point t (Sh(t)=Sh(t+1), Sv(t)=Sv(t+1); step S222), and stores them in the storage region of the storage circuit 113.

The processing circuit 114 determines whether the timer value tf of the light distribution fluctuation control processing is equal to the timeout value TF (for example, TF=100 (ms)) (step S002). In a case where the timer value tf of the light distribution fluctuation control processing is not equal to the timeout value TF (No at step S002), the processing circuit 114 repeatedly executes processing at step S002. The timeout value TF (in other words, the execution interval of the light distribution fluctuation control processing) is stored in, for example, the storage region of the storage circuit 113.

In a case where the timer value tf of the light distribution fluctuation control processing becomes equal to the timeout value TF (tf=TF; Yes at step S002), the processing circuit 114 returns to the light distribution control processing illustrated in FIG. 12.

The processing circuit 114 determines whether the illumination device 1 is powered off by control (step S109). The processing circuit 114 returns to step S200 to repeatedly execute the light distribution fluctuation control processing illustrated in FIG. 13 in a case where the illumination device 1 is not powered off by control (No at step S109). The processing circuit 114 ends the light distribution control processing in a case where the illumination device 1 is powered off by control (Yes at step S109). The light distribution state of the optical element 100 is dynamically controlled by repeatedly executing the light distribution fluctuation control processing illustrated in FIG. 13. As a result, the light distribution shape of the illumination device 1 changes as if fluctuating, thereby creating a comfortable light effect.

Modification

Figure 14:
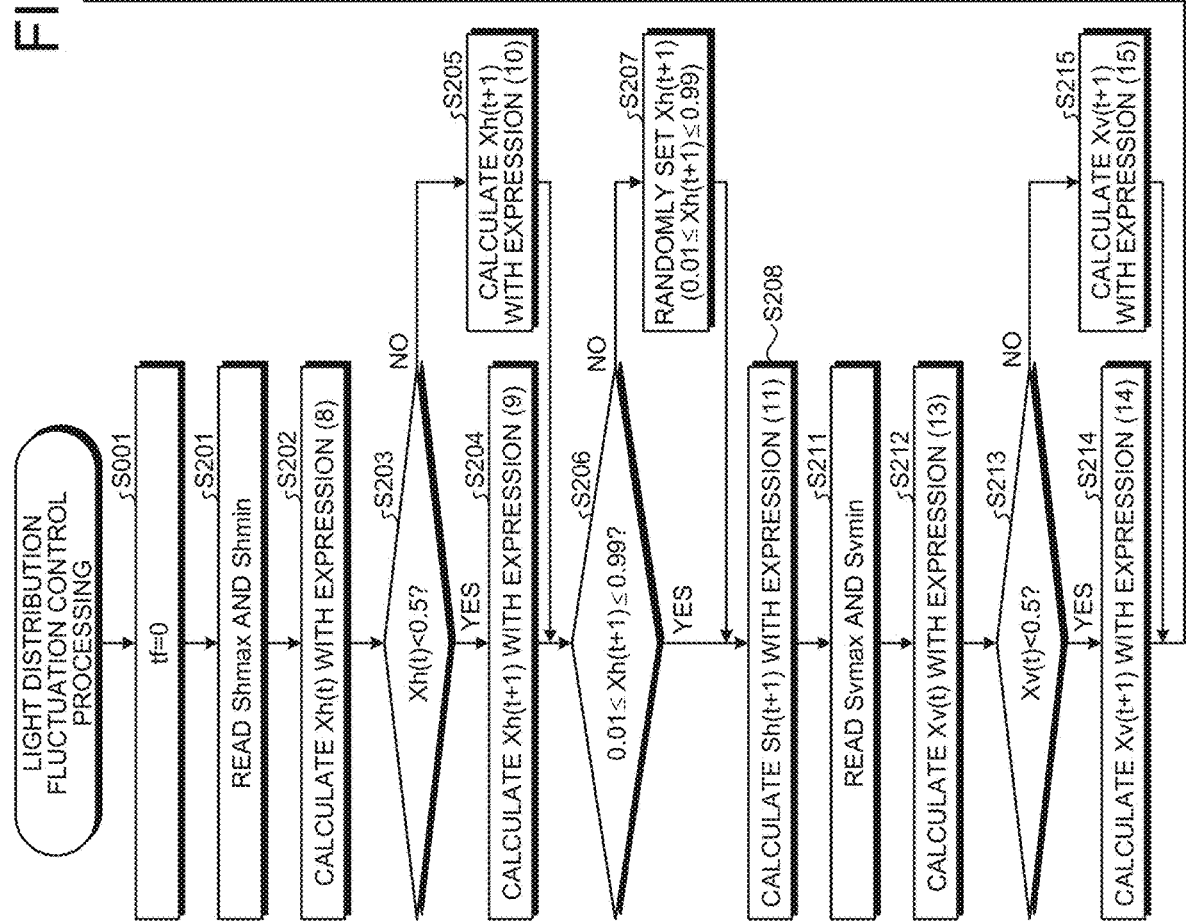
FIG. 14 is a sub flowchart illustrating an example of light distribution fluctuation control processing at an illumination device according to a modification of the first embodiment.

FIG. 14 is a sub flowchart illustrating an example of the light distribution fluctuation control processing at the illumination device according to a modification of the first embodiment. The sub flowchart illustrated in FIG. 14 corresponds to the light distribution fluctuation control processing (step S200) in the light distribution control processing illustrated in FIG. 12. Note that any difference from the sub flowchart illustrated in FIG. 13 will be described below in detail, and duplicate description is omitted.

In the light distribution fluctuation control processing of the modification of the first embodiment, after the second light distribution value (Sh(t+1), Sv(t+1)) that is a light distribution target value at the time point t+1 is calculated (step S201 to step S218), light distribution control is performed in stages with intermediate gradations between the light distribution gradation value at the time point t and the light distribution gradation value at the time point t+1 at a short time interval (hereinafter also referred to as "light distribution control interval") obtained by dividing the time (in other words, the execution interval of the light distribution fluctuation control processing) from the time point t to the time point t+1. The following describes specific processing of executing light distribution control at the light distribution control interval shorter than the execution interval of the light distribution fluctuation control processing.

For example, in a case where the execution interval of the light distribution fluctuation control processing is 100 (ms) and the number N of divisions of the execution interval of the light distribution fluctuation control processing is five, a count-up interval (in other words, the light distribution control interval with intermediate gradations) of a count value n expressed with integers from one to the number N of divisions is 20 (ms). Note that the present disclosure is not limited by the number of divisions of the execution interval of the light distribution fluctuation control processing nor the light distribution control interval with intermediate gradations. Alternatively, for example, the number N of divisions input by a user may be transmitted from the control device (not illustrated) and stored in the storage circuit 113.

Specifically, during the time between the count values n and n+1, timeout and reset occur when the count value n is reset (n=1; step S231) and when the count value n is counted up (n=n+1; step S236). In other words, the count value n is reset (n=1; step S231) or counted up (n=n+1; step S236) when a count-up timer value ts that measures the time between the count values n and n+1 reaches a timeout value TS.

After the second light distribution value Sh(t+1) that is a light distribution target value in the H direction at the time point t+1 and calculated at step S208 is stored in the storage region of the storage circuit 113 (step S208) and the second light distribution value Sv(t+1) that is a light distribution target value in the V direction at the time point t+1 and calculated at step S218 is stored in the storage region of the storage circuit 113 (step S218), the processing circuit 114 divides the time between the time points t and t+1 by N and resets the count value n and the count-up timer value ts (n=1 and ts=0; step S231). The number N of divisions of the time between the time points t and t+1 (the execution interval of the light distribution fluctuation control processing) is stored in, for example, the storage region of the storage circuit 113.

The processing circuit 114 calculates the light distribution value Sh(t+n/N) in the H direction and the light distribution value Sv(t+n/N) in the V direction at the N divided time points (t+n/N) (step S232). The light distribution value Sh(t+n/N) in the H direction at each time point (t+n/N) is represented by Expression (19) below. The light distribution value Sv(t+n/N) in the V direction at each time point (t+n/N) is represented by Expression (20) below.

$$Sh(t + n/N) = Sh(t) + \{(Sh(t + 1) - Sh(t))/N\} \times n \quad (19)$$

$$Sv(t + n/N) = Sv(t) + \{(Sv(t + 1) - Sv(t))/N\} \times n \quad (20)$$

Then, the processing circuit 114 converts the light distribution value Sh(t+n/N) and the light distribution value Sv(t+n/N) expressed as percentages from 0(%) to 100(%) into light distribution gradation values Dh(t+n/N) and Dv(t+n/N), respectively, in the optical element 100 (step S233), and outputs the light distribution gradation values Dh(t+n/N) and Dv(t+n/N) to the electrode drive circuit 112. The light distribution gradation value Dh(t+n/N) in the H direction is represented by Expression (21) below. The light distribution gradation value Dv(t+n/N) in the V direction is represented by Expression (22) below.

$$Dh(t + n/N) = Sh(t + n/N) \times \text{Gradation}/100 \quad (21)$$

$$Dv(t + n/N) = Sv(t + n/N) \times \text{Gradation}/100 \quad (22)$$

The processing circuit 114 determines whether the count-up timer value ts is equal to the timeout value TS (for example, TS=20 (ms)) (step S234). In a case where the count-up timer value ts is not equal to the timeout value TS (No at step S234), the processing circuit 114 repeatedly executes processing at step S234. The timeout value TS (in other words, the light distribution control interval with intermediate gradations) is stored in, for example, the storage region of the storage circuit 113.

In a case where the count-up timer value ts becomes equal to the timeout value TS (Yes at step S234), the processing circuit 114 subsequently determines whether the count value n is equal to the number N of divisions (for example, N=5) (step S235). In a case where the count value n is not equal to the number N of divisions (No at step S235), the processing circuit 114 adds one to the count value n and resets the count-up timer value ts (n=n+1 and ts=0; step S236) and then returns to processing at step S232 to repeatedly execute processing at steps S232 to S236 until the count value n becomes equal to the number N of divisions (Yes at step S235). Accordingly, light distribution control is performed at each time point (t+n/N) between the time points t and t+1 with intermediate gradations between the light distribution gradation value Dh(t) in the H direction at the time point t and the light distribution gradation value Dh(t+1) in the H direction at the time point t+1. In addition, light distribution control is performed at each time point (t+n/N) between the time points t and t+1 with intermediate gradations between the light distribution gradation value Dv(t) in the V direction at the time point t and the light distribution gradation value Dv(t+1) in the V direction at the time point t+1.

Figure 15:
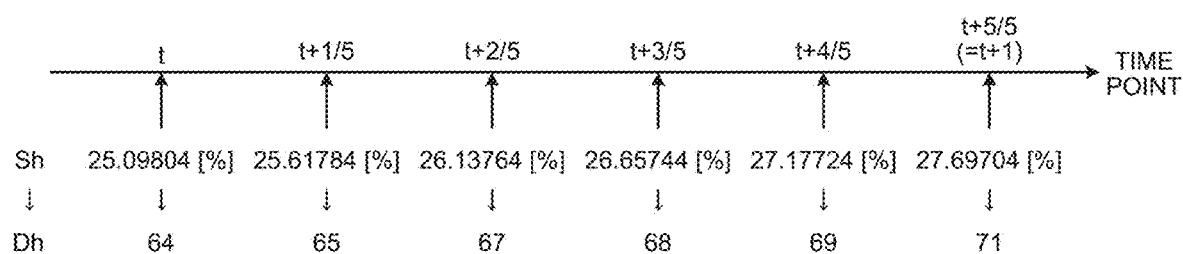
FIG. 15 is a diagram illustrating a first calculation example of intermediate gradations.

FIG. 15 is a diagram illustrating a first calculation example of intermediate gradations. In the example illustrated in FIG. 15, the light distribution value and the light distribution gradation value in the H direction are Sh and Dh, respectively. In addition, in the example illustrated in FIG. 15, the number N of divisions of the time between the time points t and t+1 is five (N=5).

For example, in a case where the first light distribution value Sh(t) in the H direction at the time point t is 25.09804 (%), the light distribution gradation value Dh(t) in the H direction at the time point t is 64.000002 (≈64), the second light distribution value Sh(t+1) that is a light distribution target value in the H direction at the time point t+1 is 27.69704(%), and the light distribution gradation value Dh(t+1) in the H direction at the time point t+1 is 70.627452 (≈71), the light distribution value Sh(t+n/N) in the H direction at each time point (t+n/N) is calculated as described below by Expression (19) above. Note that calculation of the light distribution value Sh(t+5/5) (=Sh(t+1)) in the H direction with n=5 is unnecessary and the light distribution value Sh(t+1) calculated at step S208 can be used.

$$Sh(t + 1/5) = 25.61784(\%)$$
$$Sh(t + 2/5) = 26.13764(\%)$$
$$Sh(t + 3/5) = 26.65744(\%)$$
$$Sh(t + 4/5) = 27.17724(\%)$$
$$Sh(t + 5/5) = Sh(t + 1) = 27.69704(\%)$$

In this case, the light distribution value Sh(t+n/N) in the H direction at each time point (t+n/N) is converted into the light distribution gradation value Dh(t+n/N) below by Expression (21) above. Note that the light distribution gradation value Dh(t+n/N) in the H direction is a value rounded to the nearest whole number.

$$Dh(t + 1/5) = 65.325492 \approx 65$$
$$Dh(t + 2/5) = 66.650982 \approx 67$$
$$Dh(t + 3/5) = 67.976472 \approx 68$$
$$Dh(t + 4/5) = 69.301962 \approx 69$$
$$Dh(t + 5/5) = Dh(t + 1) = 70.627452 \approx 71$$

Figure 16:
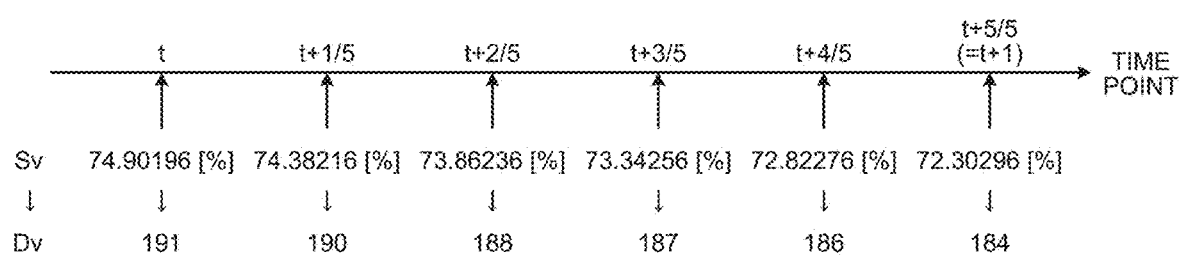
FIG. 16 is a diagram illustrating a second calculation example of intermediate gradations.

FIG. 16 is a diagram illustrating a second calculation example of intermediate gradations. In the example illustrated in FIG. 16, the light distribution value and the light distribution gradation value in the V direction are Sv and Dv, respectively. In addition, in the example illustrated in FIG. 16, the number N of divisions of the time between the time points t and t+1 is five (N=5).

For example, in a case where the first light distribution value Sv(t) in the V direction at the time point t is 74.90196 (%), the light distribution gradation value Dv(t) in the V direction at the time point t is 190.999998 (≈191), the second light distribution value Sv(t+1) that is a light distribution target value in the V direction at the time point t+1 is 72.30296(%), and the light distribution gradation value Dh(t+1) in the V direction at the time point t+1 is 184.372548 (≈184), the light distribution value Sv(t+n/N) in the V direction at each time point (t+n/N) is calculated as described below by Expression (20) above. Note that calculation of the light distribution value Sv(t+5/5) (=Sv(t+1)) in the V direction with n=5 is unnecessary and the light distribution value Sv(t+1) calculated at step S218 can be used.

$$Sv(t + 1/5) = 74.38216(\%)$$
$$Sv(t + 2/5) = 73.86236(\%)$$
$$Sv(t + 3/5) = 73.34256(\%)$$
$$Sv(t + 4/5) = 72.82276(\%)$$
$$Sv(t + 5/5) = Sv(t + 1) = 72.30296(\%)$$

In this case, the light distribution value Sv(t+n/N) in the V direction at each time point (t+n/N) is converted into the light distribution gradation value Dv(t+n/N) below by Expression (22) above. Note that the light distribution gradation value Dv(t+n/N) in the V direction is a value rounded to the nearest whole number.

$$Dv(t + 1/5) = 189.674508 \approx 190$$
$$Dv(t + 2/5) = 188.349018 \approx 188$$
$$Dv(t + 3/5) = 187.023528 \approx 187$$
$$Dv(t + 4/5) = 185.698038 \approx 186$$
$$Dv(t + 5/5) = Dv(t + 1) = 184.372548 \approx 184$$

Back in FIG. 14, in a case where the count value n+1 becomes equal to the number N of divisions (Yes at step S235), the processing circuit 114 updates the second light distribution value Sh(t+1) that is a light distribution target value in the H direction at the time point t+1 as a new first light distribution value Sh(t) in the H direction at the time point t and updates the second light distribution value Sv(t+1) that is a light distribution target value in the V direction at the time point t+1 as a new first light distribution value Sv(t) in the V direction at the time point t (Sh(t)=Sh(t+1) and Sv(t)=Sv(t+1); step S237), stores them in the storage region of the storage circuit 113, and returns to the light distribution control processing illustrated in FIG. 12. The light distribution state is controlled at each time point (t+n/N) in accordance with the light distribution value Sh(t+n/N) in the H direction and the light distribution value Sv(t+n/N) in the V direction by repeatedly executing the light distribution fluctuation control processing illustrated in FIG. 14.

In the light distribution fluctuation control processing of the modification of the first embodiment illustrated in FIG. 14, by repeating the above-described processing at steps S232 to S236 N times, the light distribution state can be smoothly changed between the first light distribution value Sh(t) in the H direction at the time point t and the second light distribution value Sh(t+1) that is a light distribution target value in the H direction at the time point t+1. Moreover, by repeating the above-described processing at steps S232 to S236 N times, the light distribution state can be smoothly changed between the first light distribution value Sv(t) in the V direction at the time point t and the second light distribution value Sv(t+1) that is a light distribution target value in the V direction at the time point t+1. Accordingly, fluctuation of the light distribution shape of the illumination device 1 can be smoothly changed.

As described above, the illumination device 1 according to the first embodiment has a configuration that allows for light distribution control in the two directions of the H and V directions, and executes dynamic light distribution control by using 1/f fluctuation in the H and V directions. Accordingly, for example, it is possible to create a more natural and comfortable light effect than in a case where dynamic control by using 1/f fluctuation is applied to light adjustment control (brightness control).

In the light distribution fluctuation control processing of the modification of the first embodiment, light distribution control is performed in stages (or stepwisely) with intermediate gradations between the light distribution gradation value at the time point t and the light distribution gradation value at the time point t+1 at the light distribution control interval that is shorter than the execution interval of the light distribution fluctuation control processing. Accordingly, the light distribution state can be smoothly changed.

Second Embodiment

Figure 17:
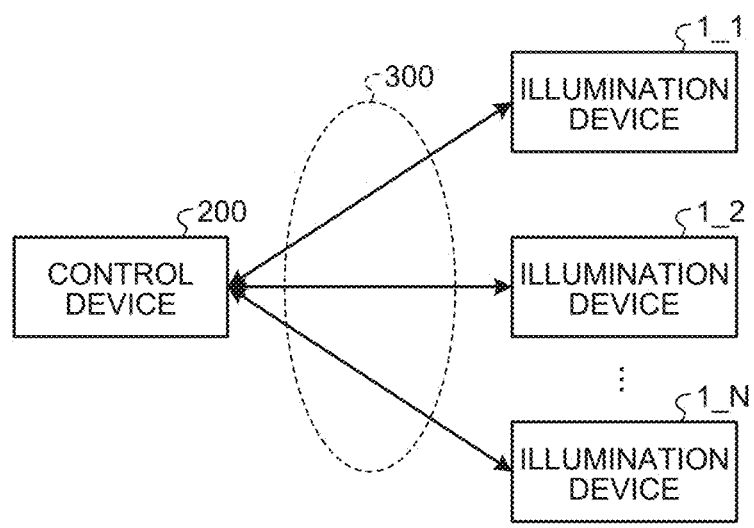
FIG. 17 is a schematic view illustrating an example of the configuration of an illumination system.

FIG. 17 is a schematic view illustrating an example of the configuration of an illumination system. The illumination system includes illumination devices 1 (1_1, 1_2, . . . , 1_N) and the control device 200. The control device 200 is, for example, a portable communication terminal device such as a smartphone or a tablet. The illumination devices 1 (1_1, 1_2, . . . , 1_N) are registered in advance to the control device 200 as control target devices with light distribution controllable by the control device 200.

Data and various command signals are transmitted and received between the illumination devices 1 (1_1, 1_2, . . . , 1_N) and the control device 200 through a communication means 300. In the present disclosure, the communication means 300 is a wireless communication means of, for example, Bluetooth (registered trademark) or WiFi (registered trademark). Wireless communication may be performed between the illumination devices 1 (1_1, 1_2, . . . , 1_N) and the control device 200 through a predetermined network such as a mobile communication network. Alternatively, the illumination devices 1 (1_1, 1_2, . . . , 1_N) and the control device 200 may be coupled to each other in a wired manner to perform wired communication therebetween.

Note that, although the illumination devices 1 (1_1, 1_2, . . . , 1_N) are registered in the example illustrated in FIG. 17, at least one illumination device 1 may be registered as a control target device with controllable light distribution in the present disclosure.

In the above-described illumination system, the control device 200 can change the light distribution state of the illumination device 1 in the H and V directions. Note that setting items such as enabling or disabling fluctuation control and the fluctuation width are set by the setting circuit 113_1 (for example, DIP switch) provided in the illumination device 1. The following describes the control device 200 of the illumination system according to the second embodiment.

Figure 18:
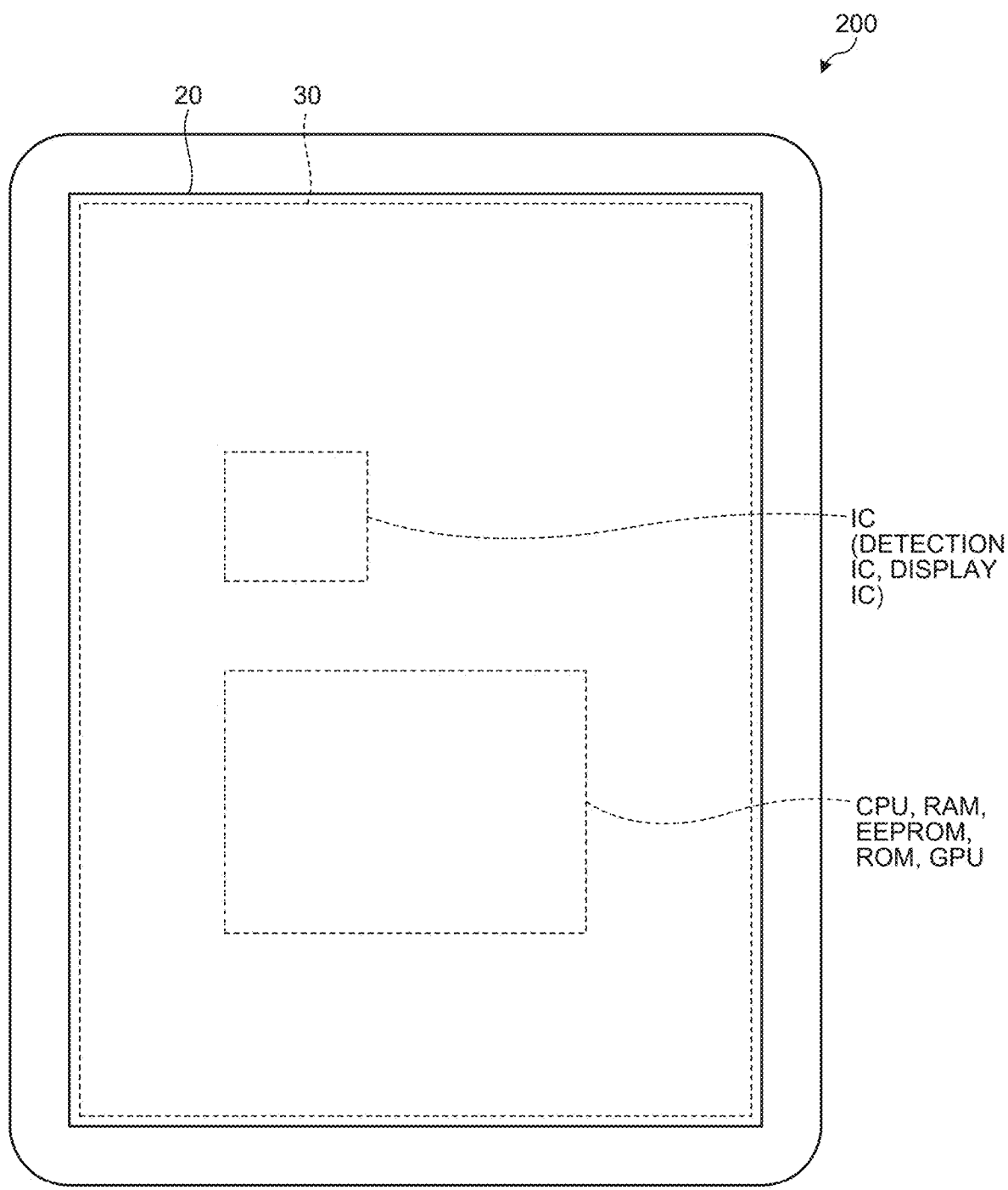
FIG. 18 is an exterior diagram illustrating an example of a control device.

FIG. 18 is an exterior diagram illustrating an example of the control device. The control device 200 is a display device (touch screen) with a touch detection function in which a display panel 20 and a touch sensor 30 are integrated. The control device 200 includes, as internal constituent components, for example, various ICs such as a detection IC and a display IC, and a central processing unit (CPU), a random access memory (RAN), an electrically erasable programmable read only memory (EEPROM), a read only memory (ROM), and a graphics processing unit (GPU) of the smartphone or tablet constituting the control device 200.

The display panel 20 is a so-called in-cell or hybrid device in which the touch sensor 30 is built and integrated. Building and integrating the touch sensor 30 in the display panel 20 includes, for example, sharing some members such as substrates and electrodes used as the display panel 20 and some members such as substrates and electrodes used as the touch sensor 30. The display panel 20 may be a so-called on-cell device in which the touch sensor 30 is mounted on a display device.

The display panel 20 is, for example, a liquid crystal display panel including a liquid crystal display element. The display panel 20 is not limited thereto but may be, for example, an organic EL display panel (OLED: organic light emitting diode) or an inorganic EL display panel (micro LED or mini LED).

The touch sensor 30 is, for example, a capacitive touch sensor. The touch sensor 30 is not limited thereto but may be, for example, a touch sensor of a resistance film scheme or a touch sensor of an ultrasonic wave scheme or an optical scheme.

Figure 19:
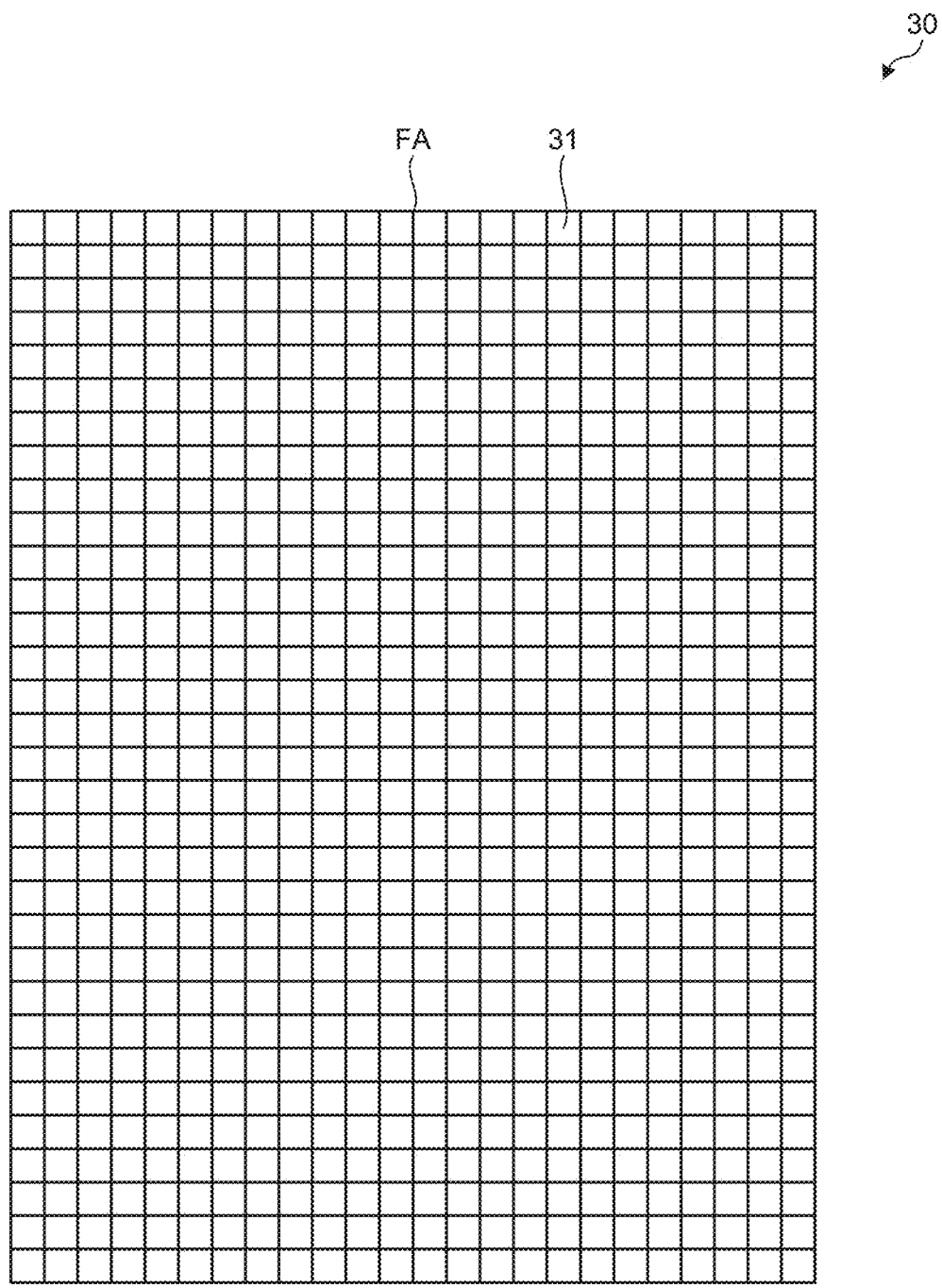
FIG. 19 is a conceptual diagram illustrating an example of a touch detection region of a touch sensor.

FIG. 19 is a conceptual diagram illustrating an example of a touch detection region of the touch sensor. A plurality of detection elements 31 are provided in a detection region FA of the touch sensor 30. The detection elements 31 in the detection region FA of the touch sensor 30 are arranged side by side in an X direction and a Y direction orthogonal to the X direction and provided in a matrix of a row-column configuration. In other words, the touch sensor 30 has the detection region FA overlapping the detection elements 31 arranged in the X direction and the Y direction.

Figure 20:
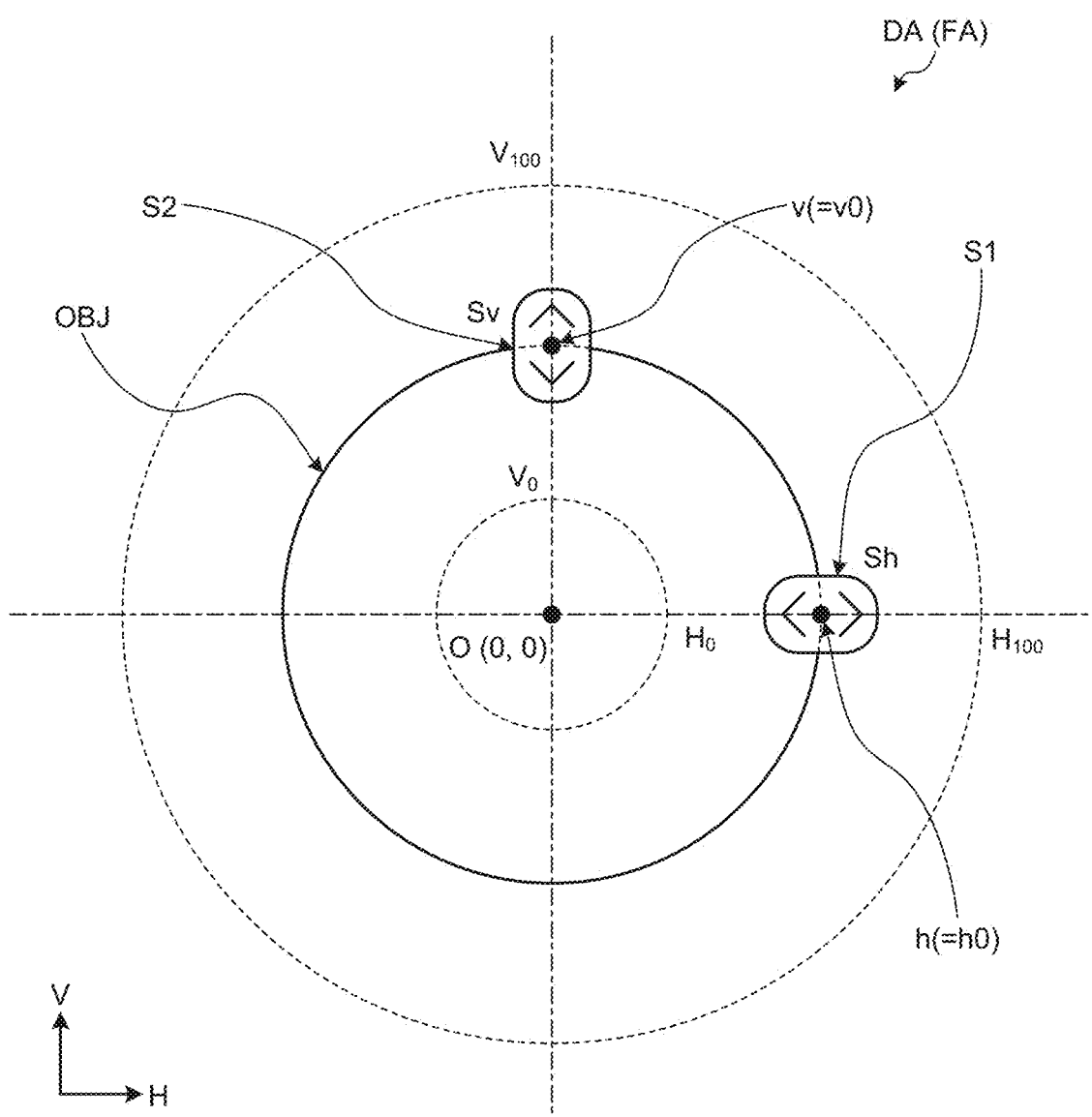
FIG. 20 is a diagram for description of an example of the display aspect of a setting change screen of the control device.

FIG. 20 is a diagram for description of an example of the display aspect of a setting change screen of the control device. A display region DA overlapping the detection region FA of the touch sensor 30 in a plan view is provided on the display panel 20 and displays the setting change screen illustrated in FIG. 20. An HV plane with an origin O(0, 0) at a predetermined position on the setting change screen illustrated in FIG. 20 is defined.

In the example illustrated in FIG. 20, a light distribution shape object OBJ with a central point at the origin O(0, 0) of the HV plane on the setting change screen is displayed, and a first slider S1 changing the light distribution state of the illumination device 1 in the H direction and a second slider S2 for changing the light distribution state of the illumination device 1 in the V direction are disposed on the outline of the light distribution shape object OBJ.

The light distribution shape object OBJ is a pictorial image corresponding to the light distribution state of light emitted from the illumination device 1.

The first slider S1 and the second slider S2 are, for example, pictorial images displayed on the display region DA, which a user can touch and move (drag operation) with a finger.

The shape of the light distribution shape object OBJ can be changed by moving the first slider S1 in the H direction. Simultaneously, the light distribution state of the illumination device 1 in the H direction is controlled. The shape of the light distribution shape object OBJ can be changed by moving the second slider S2 in the V direction. Simultaneously, the light distribution state of the illumination device 1 in the V direction is controlled.

In the present disclosure, the shape of the light distribution shape object OBJ on the setting change screen is circular or elliptical in accordance with the light distribution value Sh in the H direction and the light distribution value Sv in the V direction. In other words, the shape of the light distribution shape object OBJ changes to a circular or elliptical shape with movement of the first slider S1 and the second slider S2.

The first slider S1 can be moved in the H direction between the position on the outline of the light distribution shape object OBJ in a case where the light distribution value Sh in the H direction is 0(%) and the position on the outline of the light distribution shape object OBJ in a case where the light distribution value Sh in the H direction is 100(%).

The second slider S2 can be moved in the V direction between the position on the outline of the light distribution shape object OBJ in a case where the light distribution value Sv in the V direction is 0(%) and the position on the outline of the light distribution shape object OBJ in a case where the light distribution value Sv in the V direction is 100(%).

On the setting change screen of the control device 200, the light distribution value Sh of the illumination device 1 in the H direction can be set by the movement amount of a position h of an intersection point of the H axis of the HV plane and the outline of the light distribution shape object OBJ.

In the present disclosure, the position h of the intersection point of the H axis and the outline of the light distribution shape object OBJ is the central point of the first slider S1. In other words, a position h0 of the first slider S1 on the display region DA overlaps the position h of the intersection point of the H axis and the outline of the light distribution shape object OBJ.

Accordingly, the light distribution value Sh of the illumination device 1 in the H direction can be changed by touching the first slider S1 and moving the first slider S1 in the H direction. In FIG. 20, "Sh" indicates the light distribution value (for example, "50" (%)) of the illumination device 1 in the H direction.

On the setting change screen of the control device 200, the light distribution value Sv of the illumination device 1 in the V direction can be set by the movement amount of a position v of an intersection point of the V axis of the HV plane and the outline of the light distribution shape object OBJ.

In the present disclosure, the position v of the intersection point of the V axis and the outline of the light distribution shape object OBJ is the central point of the second slider S2. In other words, a position v0 of the second slider S2 on the display region DA overlaps the position v of the intersection point of the V axis and the outline of the light distribution shape object OBJ. Accordingly, the light distribution value Sv of the illumination device 1 in the V direction can be changed by touching the second slider S2 and moving the second slider S2 in the V direction. In FIG. 20, "Sv" indicates the light distribution value (for example, "50" (%)) of the illumination device 1 in the V direction.

Figure 21:
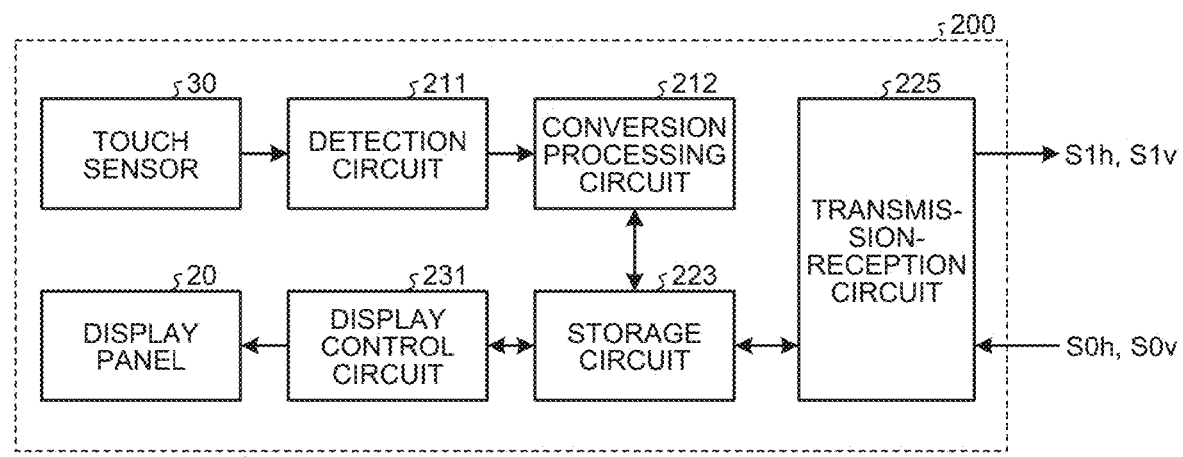
FIG. 21 is a diagram illustrating an example of a control block configuration of the control device.

FIG. 21 is a diagram illustrating an example of a control block configuration of the control device. The following describes the control block configuration for changing the light distribution state of the illumination device 1 in the H and V directions with reference to FIG. 21.

As illustrated in FIG. 21, the control device 200 includes the display panel 20, the touch sensor 30, a detection circuit 211, a conversion processing circuit 212, a storage circuit 223, a transmission-reception circuit 225, and a display control circuit 231. The detection circuit 211 is constituted by, for example, a detection IC. Alternatively, the detection circuit 211 and the display control circuit 231 may be mounted as one display IC on the display panel 20 or on an FPC coupled to the display panel 20. The conversion processing circuit 212 and the storage circuit 223 are constituted by, for example, the CPU, RAM, EEPROM, and ROM of the smartphone or tablet constituting the control device 200. The display control circuit 231 may be a display IC mounted on the display panel 20 as described above, and moreover, may include, for example, the GPU of the smartphone or tablet constituting the control device 200. The transmission-reception circuit 225 is constituted by, for example, a wireless communication module of the smartphone or tablet constituting the control device 200.

The detection circuit 211 is a circuit that detects existence of a touch on the touch sensor 30 based on a detection signal output from each detection element 31 of the touch sensor 30.

The conversion processing circuit 212 is a circuit that executes conversion processing of the position of touch detection by the detection circuit 211 into various setting values (in the present disclosure, light distribution values) of the illumination device 1. In the present disclosure, the conversion processing circuit 212 has a function to execute conversion processing of the position of touch detection by the detection circuit 211, that is the position of a touched object (pictorial image), into operation states on various screens. The conversion processing circuit 212 is a component achieved by, for example, the CPU of the smartphone or tablet constituting the control device 200.

The storage circuit 223 is constituted by, for example, the RAM, EEPROM, and ROM of the smartphone or tablet constituting the control device 200. In the present disclosure, the storage circuit 223 stores various setting values (in the present disclosure, light distribution values) of the illumination device 1.

The transmission-reception circuit 225 transmits and receives various setting values (in the present disclosure, light distribution values) to and from the illumination device 1. Specifically, the transmission-reception circuit 225 transmits the light distribution value Sh in the H direction and the light distribution value Sv in the V direction, which are set by the control device 200, to the illumination device 1 as light distribution setting values S1$h$ and S1$v$, respectively. In addition, the transmission-reception circuit 225 receives the light distribution setting values S0$h$ and S0$v$ transmitted from the illumination device 1.

The display control circuit 231 executes display control processing for displaying the above-described setting change screen on the display panel 20. The display control circuit 231 performs display control of the display panel 20 based on various setting values (in the present disclosure, light distribution values) and pictorial image position information stored in the storage circuit 223.

Figure 22:
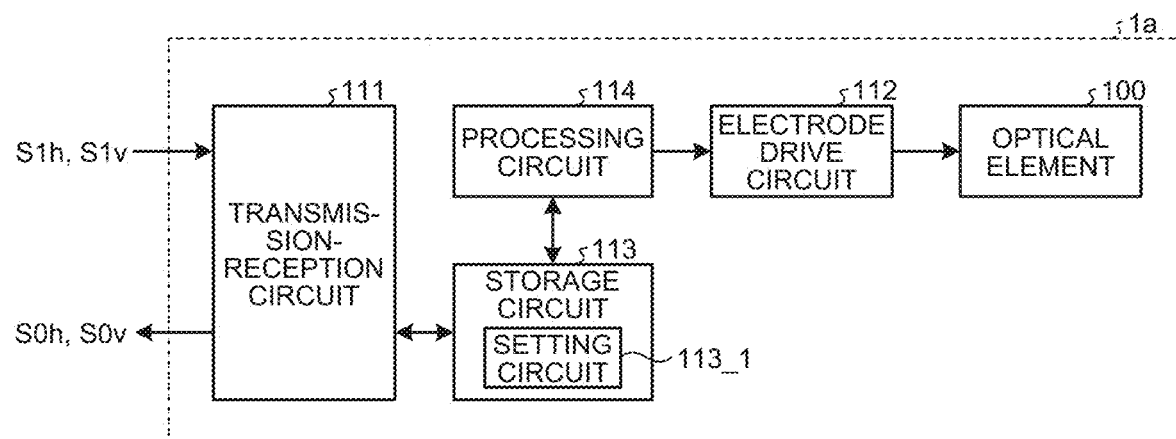
FIG. 22 is a diagram illustrating an example of a control block configuration of an illumination device according to a second embodiment.

The following describes the illumination device in the above-described illumination system. FIG. 22 is a diagram illustrating an example of a control block configuration of the illumination device according to the second embodiment. In this example, the components same as in the control block configuration of the illumination device 1 according to the first embodiment are denoted by the same reference signs, and duplicate descriptions thereof are omitted.

As illustrated in FIG. 22, an illumination device 1$a$ according to the second embodiment includes a transmission-reception circuit 111 in addition to the configuration of the illumination device 1 according to the first embodiment described above.

The transmission-reception circuit 111 transmits and receives various setting values (in the present disclosure, light distribution setting values) to and from the control device 200. Specifically, the transmission-reception circuit 111 receives the light distribution setting values S1$h$ and S1$v$ transmitted from the control device 200. The transmission-reception circuit 111 transmits the light distribution setting values S0$h$ and S0$v$ stored in the storage region of the storage circuit 113 to the control device 200.

In the present disclosure, at activation of the illumination device 1, the transmission-reception circuit 111 transmits the light distribution setting values S0$h$ and S0$v$ stored in the storage region of the storage circuit 113 to the control device 200, and stores the light distribution setting values S1$h$ and S1$v$ transmitted from the control device 200 in the storage region of the storage circuit 113 as new light distribution setting values S0$h$ and S0$v$. Accordingly, as the light distribution setting values S1$h$ and S1$v$ are transmitted from the control device 200 to the illumination device 1$a$, the light distribution setting values S0$h$ and S0$v$ in the storage region of the storage circuit 113 are updated to the light distribution setting values S1h and S1v. Note that the illumination device 1 initially stores no light distribution setting values S0h and S0v (the light distribution setting values S0h and S0v are both 0(%)). In this case, by transmitting the light distribution setting values S1h and S1v from the control device 200, the light distribution setting values S0h and S0v are thus stored in the storage region of the storage circuit 113. Note that the present invention is not limited to the above description, and predetermined values such as 50(%) may be stored in advance for the initial light distribution setting values S0h and S0v.

Figure 23:
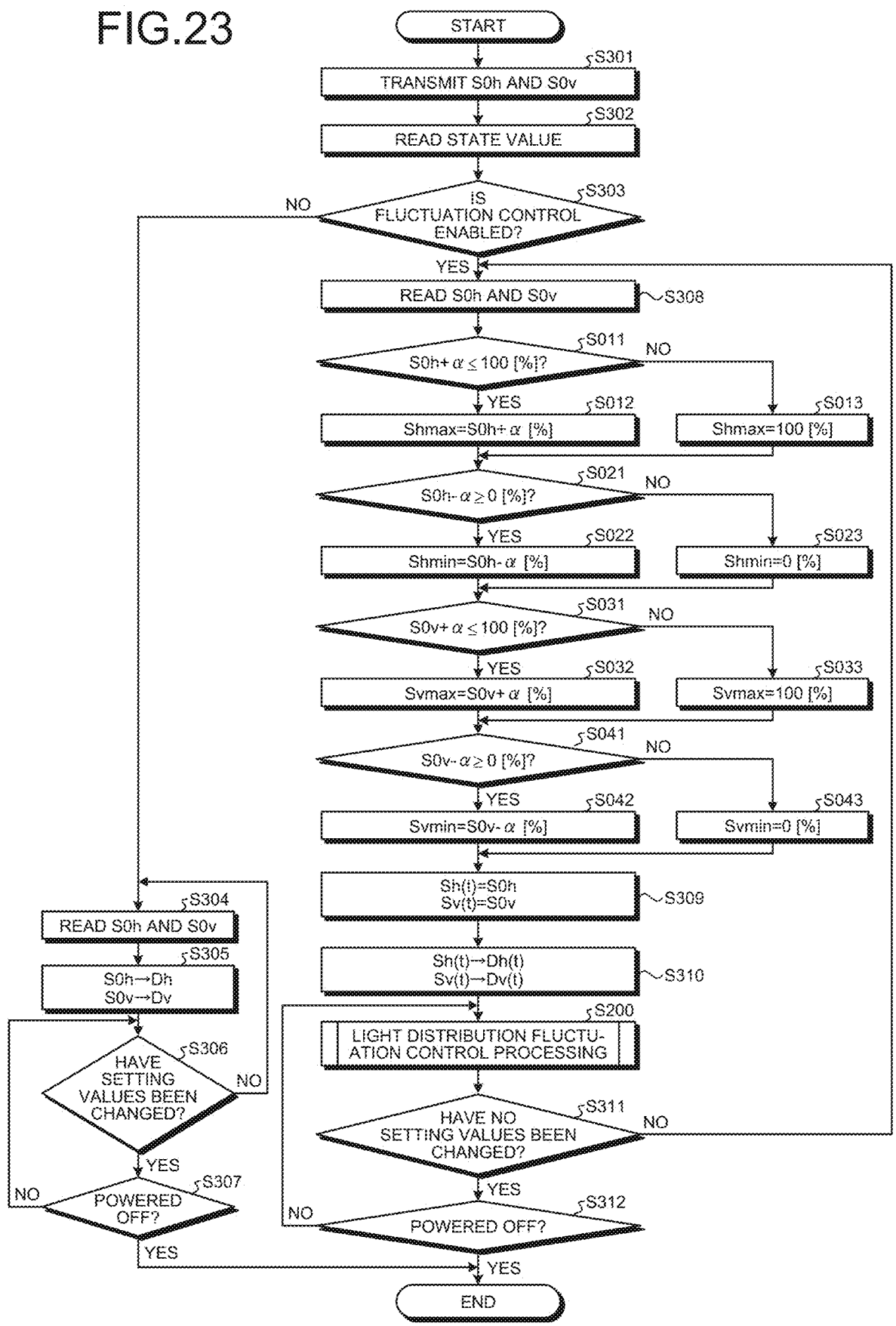
FIG. 23 is a flowchart illustrating an example of light distribution control processing at an illumination system according to the second embodiment.

In the above-described illumination system, the processing circuit 114 executes light distribution control processing describes below. FIG. 23 is a flowchart illustrating an example of the light distribution control processing at the illumination system according to the second embodiment. Note that any difference from the first embodiment will be described below in detail, and duplicate descriptions are omitted.

At activation of the illumination device 1a, the processing circuit 114 reads the light distribution setting value S0h in the H direction and the light distribution setting value S0v in the V direction, which are stored in the storage region of the storage circuit 113, and transmits the light distribution setting value S0h and the light distribution setting value S0v to the control device 200 (step S301).

The transmission-reception circuit 225 of the control device 200 stores the light distribution setting values S0h and S0v transmitted from the illumination device 1a in the storage circuit 223. When the control device 200 executes setting change processing, the display control circuit 231 of the control device 200 reads the light distribution setting values S0h and S0v stored in the storage circuit 223 and executes display control of the display panel 20 so that the shape of the light distribution shape object OBJ in accordance with the light distribution setting values S0h and S0v, the position of the first slider S1, Dx-direction light distribution display, the position of the second slider S2, and Dy-direction light distribution display are reflected on the setting change screen. Accordingly, the control device 200 transitions to a change operation waiting state.

The processing circuit 114 of the illumination device 1a reads a state value from the setting circuit 113_1 of the storage circuit 113 (step S302), and determines whether fluctuation control is enabled based on the state value (step S303).

In a case where fluctuation control is disabled (No at step S303), the processing circuit 114 reads the light distribution setting value S0h in the H direction and the light distribution setting value S0v in the V direction, which are stored in the storage region of the storage circuit 113 (step S304), converts the light distribution setting value S0h and the light distribution setting value S0v, which are expressed as percentages from 0(%) to 100(%) into the light distribution gradation values Dh and Dv, respectively, of the optical element 100 (step S305), and outputs the light distribution gradation values Dh and Dv to the electrode drive circuit 112.

The electrode drive circuit 112 supplies drive voltage in accordance with the light distribution gradation values Dh and Dv output from the processing circuit 114 to the drive electrodes 10 and 13 of each liquid crystal cell 2 of the optical element 100. Accordingly, the light distribution state is controlled in accordance with the light distribution setting value S0h in the H direction and the light distribution setting value S0v in the V direction.

Subsequently, the processing circuit 114 determines whether the light distribution setting value S0h in the H direction and the light distribution setting value S0v in the V direction, which are stored in the storage region of the storage circuit 113 have been changed (step S306).

Change of the light distribution setting value S0h in the H direction and the light distribution setting value S0v in the V direction is executed through interrupt processing. FIG. 24 is a flowchart illustrating an example of light distribution setting value change interrupt processing.

When the first slider S1 or the second slider S2 is operated on the setting change screen (refer to FIG. 20) of the control device 200, the light distribution setting value S1h in the H direction and the light distribution setting value S1v in the V direction are transmitted from the control device 200.

The transmission-reception circuit 111 of the illumination device 1a determines whether the light distribution setting values S1h and S1v transmitted from the control device 200 have been received (step S401). In a case where the light distribution setting values S1h and S1v have not been received (No at step S401), the transmission-reception circuit 111 repeatedly executes processing at step S401. In a case where the light distribution setting values S1h and S1v have been received (Yes at step S401), the transmission-reception circuit 111 stores the light distribution setting values S1h and S1v transmitted from the control device 200 in the storage region of the storage circuit 113 as new light distribution setting values S0h and S0v in the H and V directions, respectively (S0h=S1h and S0v=S1v; step S402), and returns to processing at step S401.

Back in FIG. 23, in a case where the light distribution setting value S0h in the H direction and the light distribution setting value S0v in the V direction, which are stored in the storage region of the storage circuit 113, have not been changed (Yes at S306), the processing circuit 114 determines whether the illumination device 1a has been powered off by control (step S307), and repeatedly executes processing at steps S306 to S307 in a case where the illumination device 1a has not been powered off by control (No at step S307).

In a case where the light distribution setting value S0h in the H direction and the light distribution setting value S0v in the V direction, which are stored in the storage region of the storage circuit 113 have been changed (No at S306), the processing circuit 114 repeatedly executes processing at steps S304 to S306. Accordingly, the light distribution state is controlled in accordance with the changed light distribution setting value S0h in the H direction and the changed light distribution setting value S0v in the V direction.

In a case where the illumination device 1a has been powered off by control (Yes at step S307), the light distribution control processing is ended.

In a case where fluctuation control is enabled (Yes at step S303), the processing circuit 114 reads the light distribution setting value S0h in the H direction and the light distribution setting value S0v in the V direction, which are stored in the storage region of the storage circuit 113 (step S308), and sets the fluctuation range of light distribution values in the light distribution fluctuation control processing.

After setting the fluctuation range of the light distribution value Sh for the light distribution setting value S0h in the H direction at steps S011 to S013 and S021 to S023 and the fluctuation range of the light distribution value Sv for the light distribution setting value S0v in the V direction at steps S031 to S033 and S041 to S043, the processing circuit 114 stores the light distribution setting values S0h and S0v in the H and V directions to the storage region of the storage circuit 113 as the first light distribution values Sh(t) and Sv(t), respectively, at the time point t (Sh(t)=S0h and Sv(t)=S0v; step S309). In addition, after outputting the light distribution gradation values Dh(t) and Dv(t) corresponding to the initial setting values (the light distribution setting value S0h (=Sh(t)) in the H direction and the light distribution setting value S0v (=Sv(t)) in the V direction) stored in the storage region of the storage circuit 113 to the electrode drive circuit 112 (step S310), the processing circuit 114 executes the light distribution fluctuation control processing (step S200) illustrated in FIG. 13 or 14.

Subsequently, the processing circuit 114 determines whether the light distribution setting value S0h in the H direction and the light distribution setting value S0v in the V direction, which are stored in the storage region of the storage circuit 113 have been changed (step S311).

In a case where the light distribution setting value S0h in the H direction and the light distribution setting value S0v in the V direction, which are stored in the storage region of the storage circuit 113, have not been changed (Yes at step S311), the processing circuit 114 determines whether the illumination device 1a has been powered off by control (step S312), and in a case where the illumination device 1a has been powered off by control (No at step S312), returns to step S200 to repeatedly execute the light distribution fluctuation control processing illustrated in FIG. 13 or 14.

In a case where the light distribution setting value S0h in the H direction and the light distribution setting value S0v in the V direction, which are stored in the storage region of the storage circuit 113 have been changed (No at step S311), processing at step S308 and later are repeatedly executed. Accordingly, the light distribution fluctuation control illustrated in FIG. 13 or 14 is executed based on the changed light distribution setting value S0h in the H direction and the changed light distribution setting value S0v in the V direction, and the light distribution state of the optical element 100 is dynamically controlled.

In a case where the illumination device 1a has been powered off by control (Yes at step S312), the light distribution control processing is ended.

Through the interrupt processing illustrated in FIG. 24, the illumination device 1a of the illumination system according to the second embodiment stores the light distribution setting values S1h and S1v transmitted from the control device 200 in the storage region of the storage circuit 113 as new light distribution setting values S0h and S0v (step S402), and executes processing at steps S304 to S307 or processing at steps S308 to S312. In other words, in the illumination system according to the second embodiment, the light distribution setting values S0h and S0v of the illumination device 1a can be changed by the control device 200, and in a case where the light distribution setting values S0h and S0v of the illumination device 1a have been changed (No at step S306) while fluctuation control is disabled (No at step S303), normal light distribution control is executed based on the changed light distribution setting values S0h and S0v. In a case where the light distribution setting values S0h and S0v of the illumination device 1a have been changed (No at step S311) while fluctuation control is enabled (Yes at step S303), dynamic light distribution control by using 1/f fluctuation is executed based on the changed light distribution setting values S0h and S0v.

Similarly to the first embodiment, the light distribution state of the optical element 100 is dynamically controlled by repeatedly executing the light distribution fluctuation control processing illustrated in FIG. 13. As a result, the light distribution shape of the illumination device 1 changes as if fluctuating, thereby creating a comfortable light effect.

Similarly to the modification of the first embodiment, by repeating processing at steps S232 to S236 of the light distribution fluctuation control processing illustrated in FIG. 14 N times, light distribution control is performed at each time point (t+n/N) between the time points t and t+1 with intermediate gradations between the light distribution gradation value Dh(t) in the H direction at the time point t and the light distribution gradation value Dh(t+1) in the H direction at the time point t+1. In addition, light distribution control is performed at each time point (t+n/N) between the time points t and t+1 with intermediate gradations between the light distribution gradation value Dv(t) in the V direction at the time point t and the light distribution gradation value Dv(t+1) in the V direction at the time point t+1.

Accordingly, the light distribution state can be smoothly changed between the first light distribution value Sh(t) in the H direction at the time point t and the second light distribution value Sh(t+1) that is a light distribution target value in the H direction at the time point t+1. Moreover, the light distribution state can be smoothly changed between the first light distribution value Sv(t) at the time point t in the V direction and the second light distribution value Sv(t+1) that is a light distribution target value in the V direction at the time point t+1.

Note that, although the aspect of dynamically controlling the light distribution state independently in each of the two directions of the H direction (first direction) and the V direction (second direction) is exemplarily described above in the embodiments, the present invention is not limited to the aspect of dynamically controlling the light distribution states in the two directions of the H direction (first direction) and the V direction (second direction) independently but may employ the aspect of dynamically controlling the light distribution state in at least one of the H direction (first direction) or the V direction (second direction).

The preferable embodiments of the present disclosure are described above, but the present disclosure is not limited to the embodiments. Contents disclosed in the embodiments are merely exemplary and may be modified in various kinds of manners without departing from the scope of the present disclosure. Appropriate modifications made without departing from the scope of the present disclosure naturally belong to the technical scope of the present disclosure.

What is claimed is:

1. An illumination device comprising:
   a light source;
   an optical element provided on an optical axis of the light source and configured to control a light distribution state of light emitted from the light source in two directions of a first direction and a second direction different from the first direction; and
   processing circuitry configured to execute at least light distribution control processing for the optical element, wherein
   the processing circuitry dynamically controls the light distribution state in at least one of the first direction or the second direction by using 1/f fluctuation based on a light distribution setting value that is a setting value for executing the light distribution control processing.

2. The illumination device according to claim 1, wherein the processing circuitry dynamically controls the light distributions state in the two directions of the first and second directions independently.

3. The illumination device according to claim 1, wherein the processing circuitry performs dynamic light distribution control by using 1/f fluctuation with the Intermittent Chaos Method.

4. The illumination device according to claim 3, further comprising storage circuitry in which a fluctuation width defining a change width of light distribution values during execution of the dynamic light distribution control is set, wherein
when executing the dynamic light distribution control, the processing circuitry sets a fluctuation range defined as a change range of light distribution values in the control, and
the processing circuitry calculates an upper limit value of the fluctuation range by adding the light distribution setting value and the fluctuation width and calculates a lower limit value of the fluctuation range by subtracting the fluctuation width from the light distribution setting value.

5. The illumination device according to claim 4, wherein when executing the dynamic light distribution control, the processing circuitry calculates a first variable at a time point t based on a first light distribution value that is a light distribution value for achieving the light distribution state of the optical element at the time point t and the upper and lower limit values of the fluctuation range, calculates a second variable at a time point t+1 later than the time point t based on the first variable, and calculates a second light distribution value that is a light distribution target value for achieving the light distribution state of the optical element at the time point t+1 based on the second variable and the upper and lower limit values of the fluctuation range.

6. The illumination device according to claim 5, wherein when the second variable is outside a predetermined range, the processing circuitry calculates the second light distribution value by using a random value in the predetermined range as the second variable.

7. The illumination device according to claim 6, wherein when executing the dynamic light distribution control, the processing circuitry changes the light distribution state of the optical element in stages between the time points t and t+1 with intermediate gradations between the first light distribution value at the time point t and the second light distribution value at the time point t+1.

8. An illumination system comprising:
an illumination device including a light source, an optical element, and processing circuitry, the optical element being provided on an optical axis of the light source and configured to control a light distribution state of light emitted from the light source in two directions of a first direction and a second direction different from the first direction, the processing circuitry being configured to execute at least light distribution control processing for the optical element; and
control circuitry capable of changing at least the light distribution state of the illumination device in the two directions of the first and second directions, wherein
the processing circuitry dynamically controls the light distribution state in at least one of the first direction or the second direction by using 1/f fluctuation based on a light distribution setting value that is a setting value for executing the light distribution control processing.

9. The illumination system according to claim 8, wherein the processing circuitry dynamically controls the light distribution states in the two directions of the first and second directions independently.

10. The illumination system according to claim 8, wherein the processing circuitry performs dynamic light distribution control by using 1/f fluctuation with the Intermittent Chaos Method.

11. The illumination system according to claim 10, wherein
the illumination device further includes storage circuitry in which a fluctuation width defining a change width of light distribution values during execution of the dynamic light distribution control is set, and
when executing the dynamic light distribution control, the processing circuitry sets a fluctuation range defined as a change range of light distribution values in the control, and
the processing circuitry calculates an upper limit value of the fluctuation range by adding the light distribution setting value and the fluctuation width and calculates a lower limit value of the fluctuation range by subtracting the fluctuation width from the light distribution setting value.

12. The illumination system according to claim 11, wherein when executing the dynamic light distribution control, the processing circuitry calculates a first variable at a time point t based on a first light distribution value that is a light distribution value for achieving the light distribution state of the optical element at the time point t and the upper and lower limit values of the fluctuation range, calculates a second variable at a time point t+1 later than the time point t based on the first variable, and calculates a second light distribution value that is a light distribution target value for achieving the light distribution state of the optical element at the time point t+1 based on the second variable and the upper and lower limit values of the fluctuation range.

13. The illumination system according to claim 12, wherein when the second variable is outside a predetermined range, the processing circuitry calculates the second light distribution value by using a random value in the predetermined range as the second variable.

14. The illumination system according to claim 13, wherein when executing the dynamic light distribution control, the processing circuitry changes the light distribution state of the optical element in stages between the time points t and t+1 with intermediate gradations between the first light distribution value at the time point t and the second light distribution value at the time point t+1.

15. The illumination system according to claim 11, wherein
the control circuitry transmits the light distribution setting value to the illumination device, and
the illumination device stores the light distribution setting value transmitted from the control circuitry in a storage region of the storage circuitry.

* * * * *